United States Patent [19]

Leberl et al.

[11] Patent Number: 4,928,169
[45] Date of Patent: May 22, 1990

[54] MENSURATION FRAME GRABBING APPARATUS

[75] Inventors: Franz W. Leberl, Boulder; Milan Karspeck, Loveland; Bryan Johns; Scott Lee, both of Boulder, all of Colo.

[73] Assignee: Vexcel Corp., Boulder, Colo.

[21] Appl. No.: 81,118

[22] Filed: Aug. 3, 1987

[51] Int. Cl.⁵ .............................................. H04N 7/18
[52] U.S. Cl. ..................................... 358/93; 358/107; 354/65; 356/395; 356/358; 382/8
[58] Field of Search ............... 358/101, 107, 93, 88, 358/89; 356/358, 395, 400, 401; 354/65, 83; 73/625; 250/557; 382/8

[56] References Cited

U.S. PATENT DOCUMENTS

| | | | |
|---|---|---|---|
| 3,982,837 | 9/1976 | Cummins | 356/395 |
| 4,149,788 | 4/1979 | Brown | 354/65 |
| 4,388,610 | 6/1983 | Tsunekawa | 382/8 |
| 4,485,409 | 11/1984 | Schumacher | 358/294 |
| 4,628,531 | 12/1986 | Okamoto et al. | 382/8 |
| 4,688,088 | 8/1987 | Hamazaki et al. | 358/101 |

FOREIGN PATENT DOCUMENTS 3428325  8/1985  Fed. Rep. of Germany .

OTHER PUBLICATIONS

Autoset Automatic Monocomparator, Autosel-1 Specifications (undated), Geodetic Services Corporation, Melbourne, Fla.
Rolleimetric RS-The Bridge to Digital Image Processing (undated), Rollei Fototechnic GmbH, D-3300 Braunschweig, W. Germany.
Scanner, Rollei Fototechnic GmbH, GMA—HEFT 14 vom (3-4-1986).

*Primary Examiner*—John K. Peng
*Attorney, Agent, or Firm*—James R. Young

[57] ABSTRACT

A mensuration apparatus for converting film images and paper drawings into digital photogrammatic arrays to be computer processed, displayed, mensurated and analyzed. This mensuration apparatus includes a table on whcih a translatable camera and a reseau assembly are mounted. The reseau assembly includes an object mounting plate for mounting an object such as a photograph, map, or the like, and a grid mark system for superimposing grid marks on the object. The translatable camera includes a solid state camera having a two-dimensional array of light sensor elements mounted over the reseau assembly in a translatable mounting apparatus. The translation camera can be moved to any desired position over the reseau assembly, as well as toward and away from the reseau assembly, forming three coordinate systems, which are correlated together for precise mensuration of an object image digitized by the solid state camera.

9 Claims, 14 Drawing Sheets

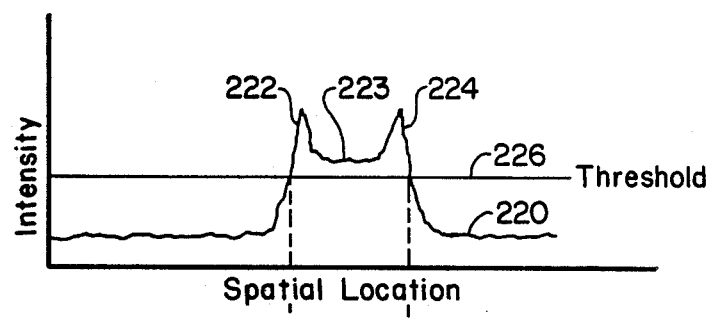
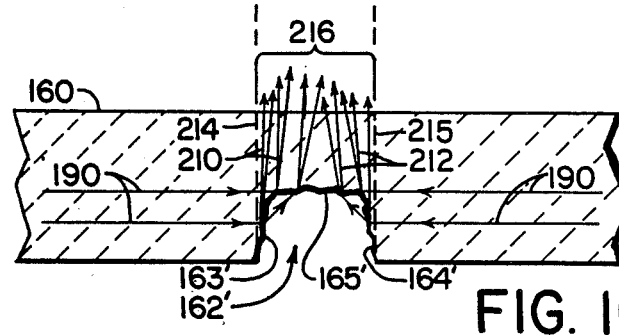
FIG. 10
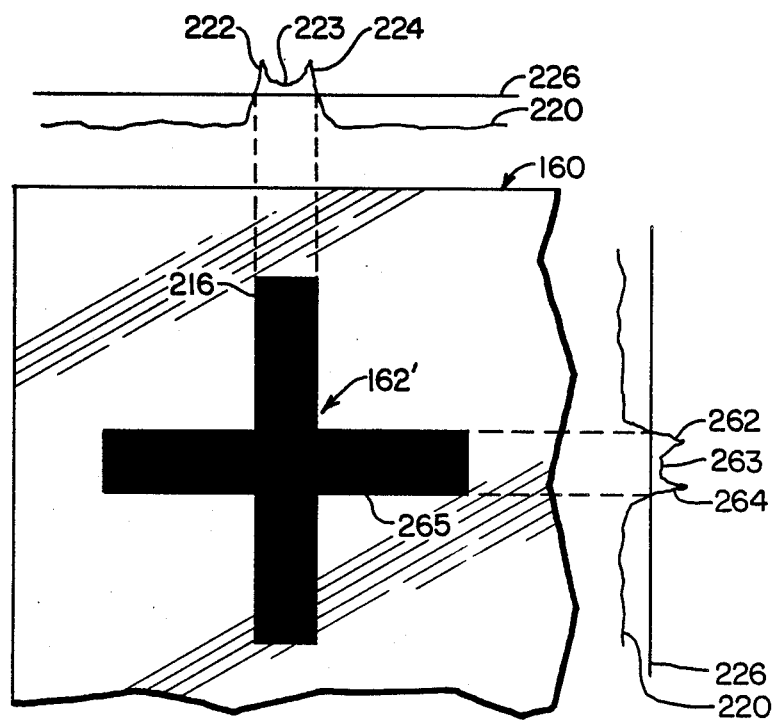
FIG. 11

MENSURATION FRAME GRABBING APPARATUS

BACKGROUND OF THE INVENTION

1. Field of the Invention:

This invention relates to digital photogrammetric apparatus and more specifically to apparatus for converting film images, paper drawings, and other hard copy documents into digital photogrammetric arrays for computer processing and enhanced display mensuration, and analysis.

2. Background of the Invention:

The photographic art for aerial surveillance, geological and archaeological study, mechanical, industrial, and architectural design and analysis, and other uses has become very well-developed over the past several decades so that sharp, clear photographic images of the earth's surface and of objects on the earth's surface are obtainable from aerial photography, satellite photography, and the like. In fact, there already are in existence virtually countless aerial photographs in files of national, state, and local government agencies, corporations, and individuals for purposes ranging widely from such things as military reconnaissance, surveillance and measurement of agricultural land and crop conditions, monitoring municipal development and growth patterns, map making, geologic assaying, land management, and the like. Additional photographing and rephotographing for subsequent comparison with previous conditions are being done on an increasing basis.

For many purposes, however, analysis of such photographic images cannot be done by visual observation with sufficient accuracy or efficiency. For example, in spite of having exceptionally clear aerial photographic images available, it may be quite impossible, even with accurate graphic instruments and a magnifying glass, to measure the wing-span of an airplane parked on an airport apron, the square feet of pavement on all of the streets in a city, or the areas of potholes in a wetlands inventory of a prairie.

Therefore, to improve their accuracy and efficiency, persons skilled in the art of photogrammetry have found that computers can be a very useful tool for enhancing the photographic images or parts of the images and to augment the analysis. To do so, the photographic image is converted into a digital format that can be stored, processed, and displayed on a computer controlled graphic display output, such as a cathode ray tube (CRT), hard copy printer, plotter, or the like.

A common method of converting a hard copy image to a digital array is to use a point sensor, such as a charge-coupled device (CCD), charge injection device (CID), or photodiode to scan the surface of the hard copy and measure the light either transmitted through, or reflected from, various points on the hard copy. The hard copy in this kind of process is usually mounted on a rotating drum or on a flat table that is movable in orthogonal X-Y directions. A large pixel array, such as a 20,000 by 20,000 pixel area, can be acquired, which may, for example, be the pixel array needed to represent the information on a 9"×9" (23 cm×23 cm) film image, assuming individual pixels of about 12.5 μm diameter.

Some systems use a linear detector or sensor array, instead of a single point sensor for the digital data acquisition. In such linear systems a large number (e.g., 1750) of individual light sensitive elements are grouped together in a linear row, and this linear array or row of sensors is used to sweep scan a path over the surface of the hard copy.

Precise mechanical motion control is required for both the individual scan lines of a single point sensor and the groups of scan lines or sweep path of linear arrayed sensors in order to obtain a meaningful and useable pixel array of the photogrammetric image. Such mechanical accuracy, while necessary for accurate pixel designation and resolution, cannot be obtained economically in the degree that would be required for resolution commensurate to pixel sizes of less than, for example, 50 microns. Also, typical operations problems with such systems usually result from inability to achieve and maintain the mechanical accuracy needed over long periods of time. Consequently, the large data arrays required and the high cost to obtain the necessary mechanical accuracy have kept the use of digital image processing of photographic images in laboratories only and away from general commercial application and use.

In recent years, several manufacturers have made available semiconductor chips on which a plurality of CCD's or CID's are arranged in a two-dimensional, rectangular array and mounted in a solid state camera, such as a "TM-540", manufactured by Pulnix, of Sunnyvale, Calif. These solid state cameras with rectangular sensor arrays can detect and measure light from a fixed frame or rectangular portion of the image that a person desires to digitize for computer use. When such cameras are used in conjunction with an analog to digital converter (sometimes called a "frame grabber" device), the signal point or linear array scanning is no longer required to acquire a pixel array of digital values for a photogrammetric computer image of a hard copy photograph, transparency, drawing, or the like. The physical spacings and sizes of the pixels are fixed by the geometric CCD or CID array and by the magnification of the hard copy image to the CCD or CID array.

These "frame grabbing" solid state cameras typically have rectangular arrays, such as, for example, about 510×492 CCD's or CID's. When properly focused on an image, each CCD or CID in the array detects light intensity from an individual spot or pixel area on the film image. Thus, a solid state camera that has an array of 510×492 CCD's on a rectangular chip will convert the portion of a film image within a focused frame to a square pixel array of 510×492, i.e., about 250,920 light intensity measurements or signals. Such an array of intensity measurements can, of course, be recorded and displayed by a computer on a CRT in the same pixel array to provide a computer image reproduction of the portion of the film image within the focused or "grabbed frame". There has been a recent announcement by at least one manufacturer that a solid state CCD camera with a 1,000×1,000 pixel array will soon be available, which will provide larger "grabbed" frames, more accuracy, or a combination of both.

While the "frame grabbing" solid state cameras with rectangular CCD or CID arrays eliminate scanning, as described above, they are applicable only where a limited size pixel array is needed. For example, such a "frame grabber" may be useful in focusing onto, and acquiring a digital image of, a particular small object, such as an airplane, that can be seen in an aerial photograph of a ten square kilometer area. However, they have not been useful before this invention for "grabbing" and digitizing larger film image areas. In order to "grab" and digitize a larger film image area, the solid state camera had to be focused over a larger film area, thus sacrificing detail accuracy, since each pixel size within the array also is focused over a larger area.

There are at least two products now available that can create a large pixel array by combining a "frame grabbing" two-dimensional image array with a scanning motion. In such systems, individual frames or sub-areas of larger macro-areas of film or paper photographs can be "grabbed" or digitized and stored. Then, adjacent frames can be "grabbed" and positioned correctly in the computer memory by either (1) moving the "frame grabbing" solid state camera very precisely to a predefined adjacent position mechanically and then "grabbing" the pixel array for that adjacent position, or (2) by moving the camera less precisely to "grab" the image at the adjacent location and relying on a precisely located grid mark or pattern of grid marks to geometrically relate one "grabbed" sub-area to the next "grabbed" sub-area. The "Autoset-1" manufactured by Geodetic Services Incorporated, of Melbourne, Fla. is an example of the former of these techniques, and the "Rolleimetric RS", manufactured by Rollei Fototechnic GmbH, of Braunschweig, West Germany, is an example of the latter technique.

In general, reasonably priced opto-mechanical scanners have not been able to achieve the accuracy considered to be necessary for many of the newly-evolving applications. Scanners that could achieve high geometric resolution are slow and often force a user to resort to an off-line scanning process separate from the process of actually using and analyzing the data.

Frame grabbing solid state camera systems, as described above, provide a higher degree of accuracy within a small frame pixel array sub-area. However, combining frame grabbing with scanning to get digital data over a larger macro-area again usually sacrifices accuracy for economy or economy for accuracy due to the need for highly accurate mechanical position control. The Rollei system mentioned above, and further described in the West German patent No. DE3428325, is considered to be a significant advancement in this regard by teaching the use of reseau grids in combination with a "frame grabbing" solid state camera, but it still requires manual identification of reseau grids or crosses. Also, the reseau crosses or grids are visible in the image and obliterate some of the contents of the photographic image where the grid marks are located. Also, the process of using a reseau in that manner is slow.

SUMMARY OF THE INVENTION

Accordingly, it is an object of the present invention to provide a fast, accurate, yet relatively inexpensive image digitizing and mensuration system for analyzing hard copy photographic, transparency, paper drawing, radar, and other images.

A more specific object of the present invention is to provide an improved mensuration frame grabbing system for digitizing and analyzing hard copy photographic, transparency, paper drawing, radar, and other images.

A still more specific object of the present invention is to provide an improved reseau grid for a mensuration frame grabbing system in which the reseau grid does not obscure or cover any part of the image and does not become a part of the image.

Another specific object of the present invention is to provide a frame grabbing digitizing mensuration system that uses a reseau grid location reference system in which individual reseau detection and location is automatic.

Still another specific object of this invention is to provide an image digitizing system in which one or more specific sub-areas of a large macro-area image can be converted to digital format without having to convert the entire macro-area image to digital format if not desired, thus avoiding the use of unnecessary computer storage and off-line creation of a large pixel array and allowing mass storage of currently uninteresting image to be kept on film only, yet which also has the capability of digitizing an entire large format macro-area image, if desired, in an efficient, accurate manner.

A further specific object of the present invention is to provide a system that can quickly and accurately digitize a select feature shown in stereo photographs, correlate the digital images, and display them in a stereo image, such as a three-dimensional display or other stereo overlapping images, on a CRT, graphic display device, or the like.

A still further object of the present invention is to provide a relatively inexpensive, compact apparatus for digitizing and analyzing hard copy images in which all parts of a large hard copy image are kept visible and stationary at all times.

Additional objects, advantages, and novel features of this invention are set forth in part in the description that follows, and in part will become apparent to those skilled in the art upon examination of the following specification or may be learned by the practice of the invention. The objects and advantages of the invention may be realized and attained by means of the instrumentalities and in combinations particularly pointed out in the appended claims.

To achieve the foregoing and other objects and in accordance with the purposes of the present invention, as embodied and broadly described herein, the apparatus of this invention includes a table on which a translatable camera and a reseau assembly are mounted. The reseau assembly includes a structure for mounting an object, such as a film, photograph, or the like, and a grid mark system for superimposing grid marks on the object. A solid state camera having a two-dimensional array of light sensor elements is mounted over the reseau assembly in a translatable camera mounting apparatus, so it can be moved to any desired position over the reseau assembly, as well as up and down or toward and away from the reseau assembly. The apparatus also includes three coordinate systems: (1) a table coordinate system for the position of the camera in the table; (2) an image coordinate system for the object image; and (3) a frame coordinate system for specific light sensor positions in the camera. These three coordinate systems are correlated together for precise mensuration of an object image digitized by the camera.

BRIEF DESCRIPTION OF THE DRAWINGS

These and other objects of the present invention will become more readily appreciated and understood from a consideration of the following detailed description of the preferred embodiment when taken together with the accompanying drawings, in which:

FIG. 10 is an enlarged cross-sectional view of the grid of an alternate embodiment grid structure similar to that shown in FIG. 8 but modified to achieve an alternate grid image effect;

FIG. 11 is an enlarged plan view of a computer image of the reseau grid of FIG. 10 according to the present invention;

DETAILED DESCRIPTION OF THE PREFERRED EMBODIMENT

Figure 1:
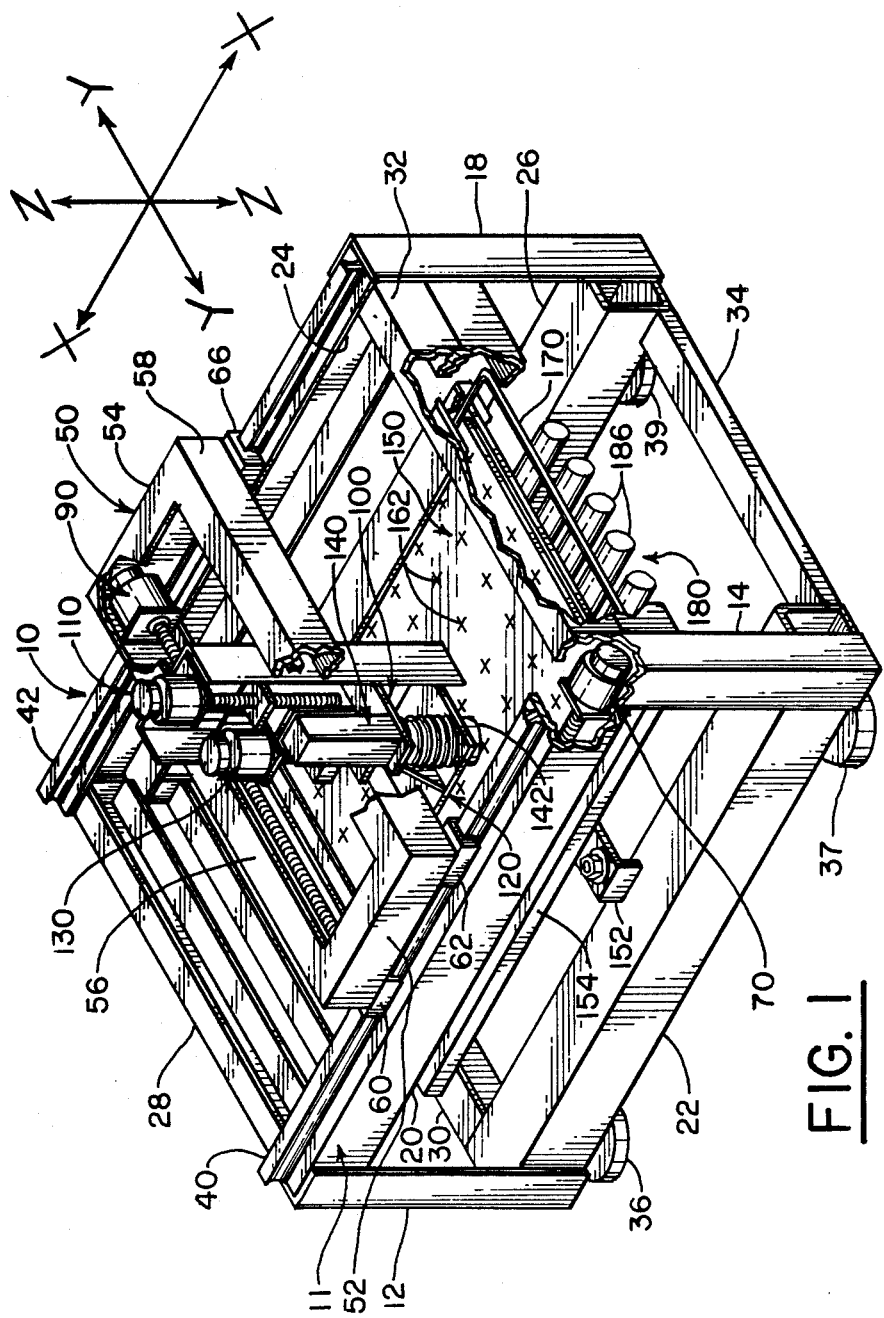
FIG. 1 is a perspective view of the mensuration frame grabbing apparatus of the present invention with portions of the components cut away in several places to reveal the positions and structures of significant components of the apparatus.

The mensuration frame grabbing apparatus 10 according to the present invention is comprised of a translation mounting structure in which a solid state camera 140 can be moved in orthogonal X,Y and Z directions in relation to a reseau assembly 150. An object or image 176 to be digitized for computer storage, manipulation, and analysis, such as a photograph, map, film transparency, radar image, or the like can be mounted in the reseau assembly. The reseau assembly 150 includes a reseau plate 160 that contains a plurality of grid mark grooves 162, preferably in the shape of crosses, which are utilized to mark and coordinate spatial locations of the image on the object 176, as will be described in more detail below. One of the significant features of this invention is the manner in which the grid mark grooves are created and utilized, as will be described in more detail below.

Referring now to FIGS. 1,2,3, and 4, the mensuration frame grabbing apparatus 10 has a superstructure frame or table 11 that is comprised of four upright corner members 12, 14, 16, and 18. The tops of these corner frame members 12, 14, 16, 18 are connected together in a rectangular manner by an elongated top front frame member 20, an elongated top rear frame member 24, an elongated top left side frame member 28, and an elongated top right side frame member 32. Similarly, the bottom ends of the corner frame members 12, 14, 16, 18 are connected together by an elongated bottom front frame member 22, an elongated rear bottom frame member 26, an elongated bottom left side frame member 30, and an elongated bottom right side frame member 34. This superstructure forms the framework or table 11 on which the other operating components of the apparatus 10 are mounted. Footpads 36, 37, 38, 39 are provided under the corners for supporting, leveling, and, if preferred, cushioning the apparatus from shock and vibration.

The top front frame member 20 and the top rear frame member 24 of the table 11 described above also function as the X direction translation structure for the camera carriage assembly 100, as will be described in more detail below. A Y-axis translation platform assembly 50 is supported by the frame members 20, 24 and provides the Y axis translation mounting for the camera carriage assembly 100. A double Z-axis mounting structure 80 is mounted in the platform assembly 50, as will be described in more detail below.

The camera carriage assembly 100 is mounted in the double Z-axis mounting structure 80 in such a manner that it moves vertically upwardly and downwardly in relation to the reseau assembly 150. Also, a lens carriage assembly 120 is mounted on the camera carriage assembly 100 within the double Z-axis mounting structure 80 in such a manner that it also is movable upwardly and downwardly in the Z-axis direction in relation to the camera carriage assembly 100. As a result, when a solid state camera 140 is mounted on the camera carriage assembly 100, and the lens assembly 142 is mounted on the lens carriage assembly 120, both the camera 140 and the lens assembly 142 can be moved in unison upwardly and downwardly in relation to the reseau assembly 150, or the lens assembly itself can be moved upwardly and downwardly in the Z-axis direction in relation to both the camera 140 and the reseau assembly 150, as desired. This double Z-axis translational ability allows optimum camera positioning and lens focusing for achieving an optimum of desired magnification and high-quality transformation of selected parts of the image on object 176 into digital data for computer storage, manipulation, recall, and display.

With continuing reference to FIGS. 1,2,3, and 4, the top front frame member 20 and the top rear frame member 24 are each fabricated preferably of elongated channel-shaped structures. An elongated trackway or rail 40 is positioned substantially along the entire length on the top surface of frame member 20. Likewise, a similar elongated rail or trackway 42 is positioned along substantially the entire length on the top surface of frame member 24. These trackways 40, 42 serve as the support surface for the platform assembly 50 in such a manner that the platform assembly 50 can translate leftwardly and rightwardly in the direction of the X-axis. The X-axis drive assembly 70 is positioned in the channel-shaped frame member 20 and is connected to the platform assembly 50, as will be described in more detail below, for moving the platform assembly 50 in a very controlled manner in the direction of the X-axis.

The platform assembly 50 has a rigid frame structure comprised of elongated left side channel member 56 and elongated right side channel member 58 connected together in spaced apart relation to each other by front channel member 52 and rear channel member 54 to form a rigid rectangular frame structure. Cage guides 60, 62, 64, 66 are permanently affixed under opposite corners of the rectangular frame structure of platform assembly 50 to support the platform assembly 50 in a confined, slideable manner on the trackways 40, 42. Specifically, the front cage guides 60, 62 are slideably mounted on the front trackway 40, and the rear cage guides 64, 66 are slideably mounted on the rear trackway 42. These trackways and cage guides are configured in such a manner that the platform assembly 50 can slide longitudinally leftwardly or rightwardly in the direction of the X-axis, but it is constrained against movement in any other direction.

Figure 2:
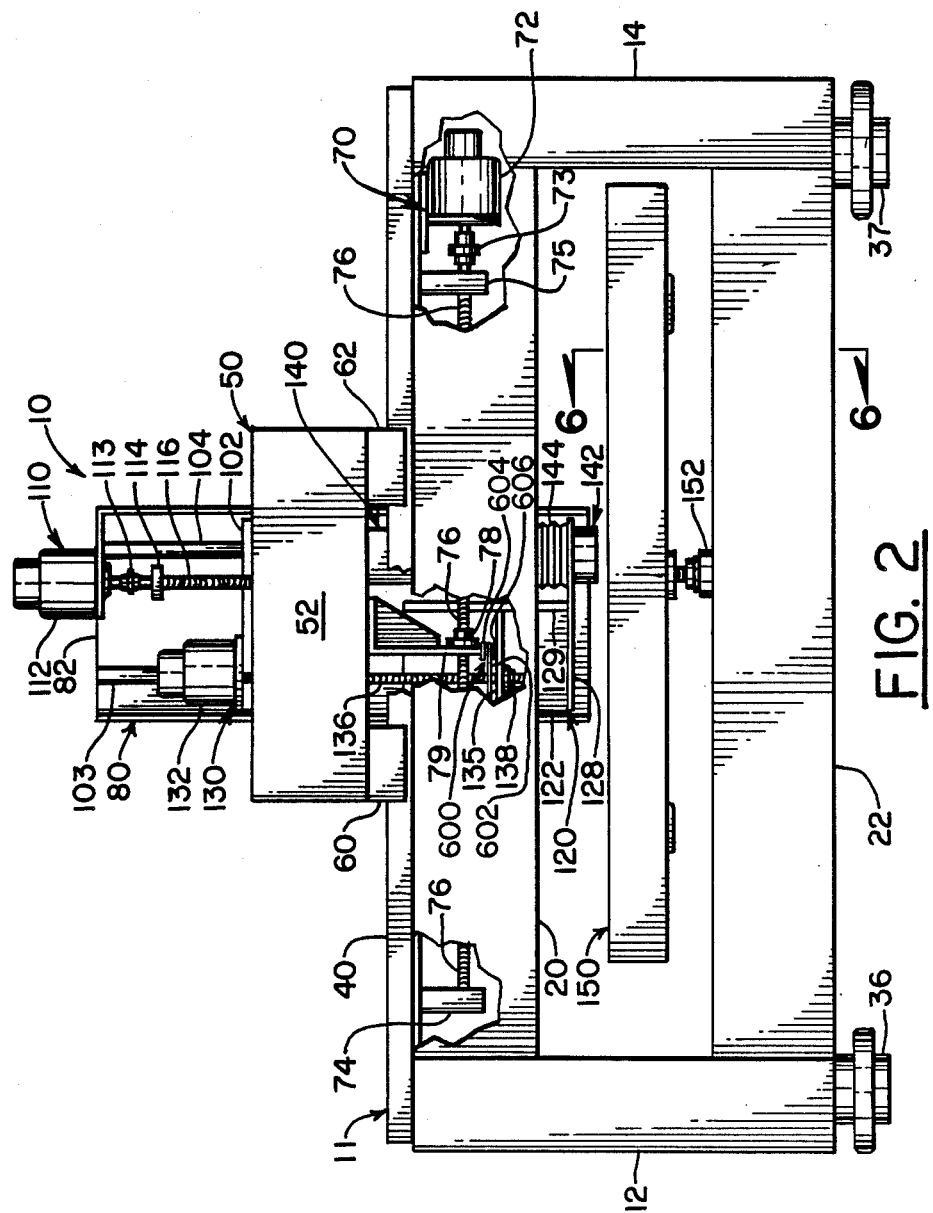
FIG. 2 is a front elevation view of the mensuration frame grabbing apparatus with portions of the structure cut away to reveal the positions and structures of significant components.

As best seen in FIG. 2, the X-axis drive assembly 70 is mounted in the channel-shaped frame member 20. A bracket 79 is rigidly attached to the underside of front frame member 52 of platform assembly 50 and extends downwardly to a position adjacent the channel member 20. A stepper motor 72 mounted in the channel member 20 is connected by a coupler 73 to an elongated lead screw rod 76 that extends substantially along the length of channel member 20. The screw rod 76 is supported at each end by journal bearings 74, 75, which are also attached to the inside of the channel-shaped frame member 20. The screw rod 76 also extends through and engages a ball nut 78 that is attached to the bracket 79. Therefore, when the screw rod 76 is turned in one direction by the stepper motor 72, the ball nut 78 and bracket 79 pull the platform assembly 50 in one direction along the X-axis, and when the stepper motor 72 turns the screw rod 76 in the opposite direction, the platform assembly 50 is likewise moved in the opposite direction along the X-axis.

Referring again to all of FIGS. 1, 2, 3, and 4, it can be seen that the double Z-axis mounting structure 80 is positioned in the space between the left and right frame members 56, 58 of platform assembly 50. The principal structural component of the double Z-axis is preferably an elongated, rigid channel member 82, which provides a mounting structure for a camera carriage assembly 100 and a lens carriage assembly 120, both of which will be described in more detail below.

Figure 4:
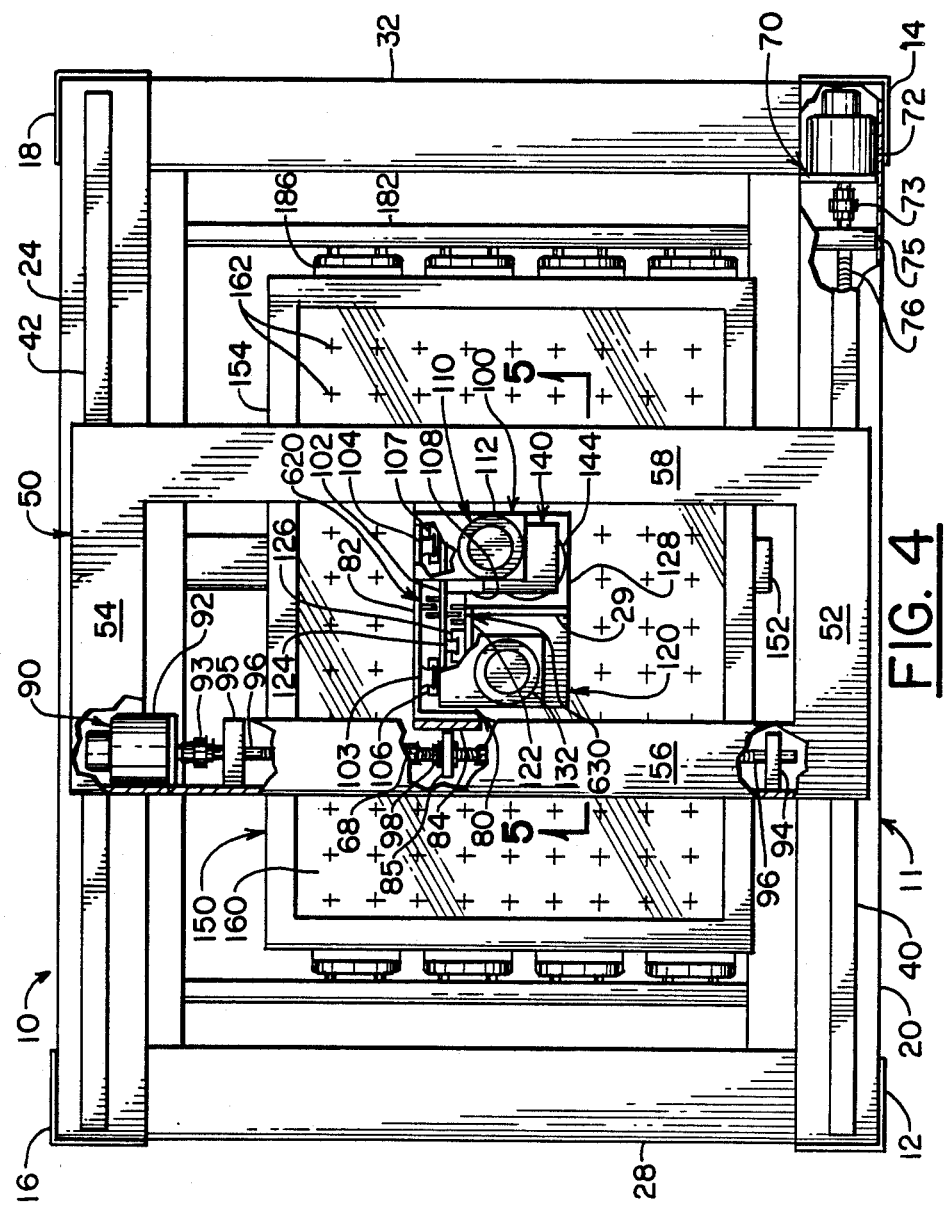
FIG. 4 is a plan view of the mensuration frame grabbing apparatus of the present invention with portions of the structure cut away to reveal the positions and structures of significant components.
Figure 5:
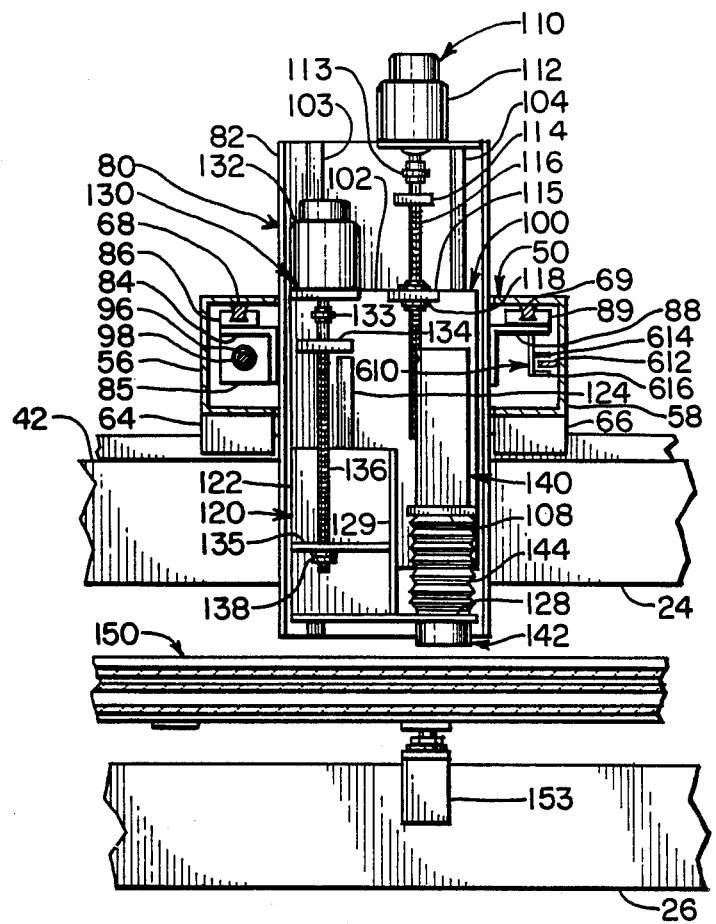
FIG. 5 is a cross-sectional view taken along lines 5—5 of FIG. 4 to show the components and structure of the double Z-axis drive apparatus.

As best seen in FIG. 5, in conjunction with FIGS. 1 and 4, the channel member 82 of the double Z-axis mounting structure 80 is positioned between the left and right frame members 56, 58 in such a manner that it can be moved or translated in the direction of the Y-axis. A pair of angle iron brackets 84, 88 rigidly affixed to opposite sides of the channel member 82 extend outwardly in opposite directions into the channel frame members 56, 58 respectively. A pair of rails or trackways 68, 69 are positioned over the angle iron brackets 84, 88 and affixed to the respective top flanges of the channel frame members 56, 58. A left cage guide 86 is affixed to the top flange of the angle iron bracket 84 in a position to slideably engage the trackway 68. Likewise, a right cage guide 89 is affixed to the top flange of angle iron bracket 88 in a position to slideably engage the trackway 69. Therefore, the double Z-axis mounting structure 80 is effectively suspended from the trackways 68, 69 in such a manner that it is slideably movable forwardly and backwardly along the direction of the Y-axis, but is restrained against movement in any other direction in relation to the platform 50.

The double Z-axis mounting structure 80 is moved back and forth in the direction of the Y-axis by the Y-axis drive apparatus 90. This Y-axis drive mechanism 90 is comprised of a stepper motor 92 connected to an elongated screw rod 96 by a coupling 93. The screw rod 96 is mounted in the left channel frame member 56 of platform 50 by journal bearings 94, 95 positioned respectively at opposite ends of the screw rod 96. The midportion of the screw rod 96 passes through an ear 85 in bracket 84. A ball nut 98 in the ear 85 engages the threads of the screw rod 96 in such a manner that rotational movement of the screw rod 96 moves the channel member 82 of the double Z-axis mounting structure 80 along the Y-axis. Therefore, actuation of the stepper motor 92 in one direction causes the double Z-axis mounting structure 80 to move forwardly in the platform 50, and actuation of the stepper motor 92 in the opposite direction causes the double Z-axis mounting structure 80 to move rearwardly in the platform 50.

Referring now primarily to FIGS. 4 and 5, the double Z-axis mounting structure 80 includes a camera carriage assembly 100 and a lens carriage assembly 120. Both the camera carriage assembly 100 and the lens carriage assembly 120 have separate drive assemblies 110, 130, respectively, to move them upwardly and downwardly either together or semi-independently in the direction of the Z-axis. Specifically, the camera carriage assembly 100 is slideably mounted in the channel member 82 in such a manner that it can be moved upwardly and downwardly in the direction of the Z-axis by the camera assembly drive apparatus 110. The lens carriage assembly 120 is slideably mounted on the camera carriage assembly 100 in such a manner that it can be moved upwardly and downwardly in the direction of the Z-axis in relation to the camera carriage assembly 100 by the lens carriage drive apparatus 130. The solid state camera 140 is mounted on the camera carriage assembly 100, and the lens assembly 142 is mounted on the lens carriage assembly 120. Therefore, the distance between the lens 142 and the camera 140 can be adjusted for desired magnification by actuating the lens carriage drive mechanism 130. Then, when the desired distance between the lens 142 and camera 140 is attained, the entire assembly of the camera 140 and lens 142 can be moved as a unit upwardly and downwardly in relation to the reseau assembly 150 for proper focusing.

The camera carriage assembly 100 is comprised of a vertically oriented plate 102 positioned in the channel member 82 with a horizontal camera mounting bracket 108 extending laterally outwardly from the plate 102. A pair of trackways 103, 104 are affixed to the inside surface of the web portion of channel member 82. Each of the trackways 103, 104 is positioned in a vertical orientation and in parallel spaced apart relation to each other. A pair of cage guides 106, 107 are affixed to the plate 102 in positions where they slideably engage the trackways 103, 104, respectively. Therefore, the plate 102 and camera mounting bracket 108 are movable upwardly and downwardly on the trackways 103, 104, while being restrained against movement in any other direction in relation to the channel member 82. The solid state camera 140 is mounted on the camera mounting plate 108 so that it also moves upwardly an downwardly along with the plate 102.

The camera carriage drive assembly 110 is comprised of a reversible stepper motor 112 connected to an elongated screw rod 116 by a coupler 113. The screw rod 116 extends through an ear 115 affixed to the plate 102 where it is threadedly engaged by a ball nut 118 mounted in the ear 115. A bearing block 114 attached to the channel member 82 supports the screw rod 116. Therefore, actuation of the stepper motor 112 in one direction moves the camera carriage assembly 100 upwardly, and actuation of the stepper motor 112 in the opposite direction moves the camera carriage assembly 100 downwardly in relation to the channel member 82.

The lens carriage assembly 120 is comprised of a vertically oriented plate 122 positioned adjacent the forward surface of the plate 102 of camera carriage assembly 100. A horizontal shelf 128 extends outwardly and laterally from the bottom edge of plate 122 to a position directly under the camera 140, and a brace member 129 helps to support the shelf 128 in a rigid, nonmovable manner in relation to the plate 122. An elongated trackway 124 is affixed in a vertical orientation to the front face of plate 102. A cage guide 126 is affixed to the rear surface of plate 122 in a position where it slideably engages the trackway 124. Therefore, the lens carriage assembly 120 is moveable upwardly and downwardly on trackway 124 in relation to the plate 102, but it is restrained from movement in any other direction in relation to plate 102. The lens assembly 142 is mounted on the shelf 128 directly under the camera 140 so that it also moves upwardly and downwardly along with the lens carriage assembly 120 on the trackway 124.

The lens carriage drive assembly 130 is comprised of a reversible stepper motor 132 mounted on the plate 102 and connected by coupler 133 to an elongated screw rod 136. A journal bearing 134 attached to the plate 102 supports the screw rod 136. The screw rod 136 also extends through a bracket 135 rigidly attached to the front face of plate 122. A ball nut 138 mounted in bracket 135 threadedly engages the screw rod 136. Therefore, actuation of the stepper motor 132 in one direction causes the lens carriage assembly 120 to move upwardly in relation to the camera carriage assembly 100, and actuation of the stepper motor 132 in the opposite direction causes the lens carriage assembly 120 to move downwardly in relation to the camera carriage assembly 100. An expandable and contractable tubular envelope or light shroud 144 is shown attached at its upper end to the camera mounting bracket 108 and at its bottom end to the lens shelf 128. This envelope 144 keeps extraneous light out of the optical path between the lens 142 and camera 140.

Referring again to FIGS. 1 through 5, the reseau assembly 150 can be mounted by brackets 152, 153, or any other appropriate mounting structure, to the frame members 22, 26 in such a manner that the reseau assembly 150 is positioned under the solid state camera 140 and lens 142. Therefore, as can be appreciated from the description above, the X-axis drive assembly 70 and Y-axis drive assembly 90 can move the camera 140 and lens 142 to any desired position over the reseau assembly 150. Further, the camera carriage drive assembly 110 can move the camera 140 and lens 142 in unison upwardly and downwardly in relation to the reseau assembly 150 as desired. Further, as described above, the lens carriage drive assembly 130 can move the lens 142 upwardly and downwardly in relation to the camera 100 as desired.

Figure 3:
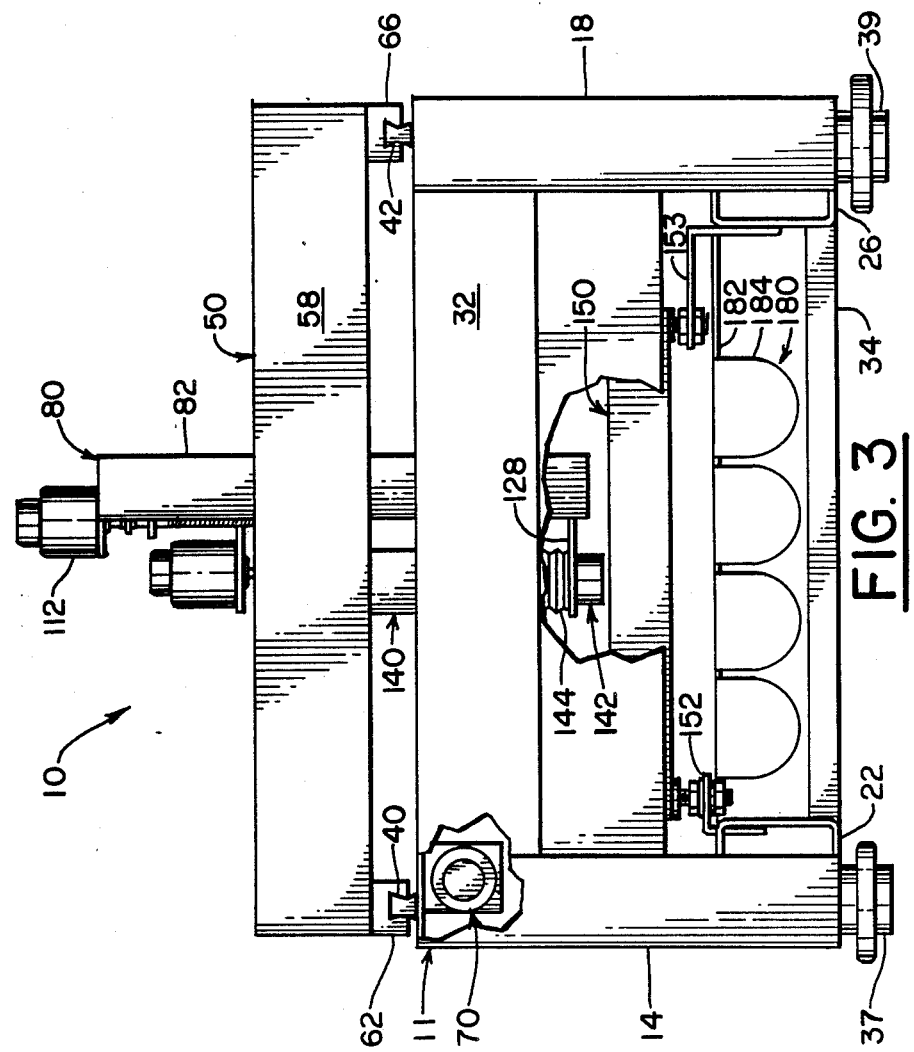
FIG. 3 is a right side elevation view of the mensuration frame grabbing apparatus shown with several parts of the structure cut away to reveal the positions and structures of significant components.

The reseau assembly 150 is best described by reference primarily to FIG. 6 in combination with FIGS. 1,3, and 4. A transparent object support plate 172 is mounted horizontally in the lower fixed portion 156 of a frame 154. An object 176, such as a photograph, film transparency, map, or the like can be positioned on the upper surface of the object support plate 172. A reseau plate 160 is then positioned directly on top of the object 176 and clamped in place by the upper portion 155 of frame 154. The upper portion 155 of frame 154 is hinged to the bottom portion 156 by a hinge assembly 157 to accommodate convenient removal of the reseau plate 160 and object 176 from the surface of the object support plate 172. The reseau plate 160 includes a plurality of grid marks 162, preferably in the shape of crosses, in a precisioned measured pattern on its bottom surface. The structures and usage of these grid marks 162 will be described in more detail below.

A bottom light assembly 180 is positioned under the reseau assembly 150. This bottom light assembly 180 can be comprised of a plurality of fluorescent bulbs 186 or other suitable light sources. The fluorescent bulbs 186 are shown mounted in sockets 184 attached to brackets 182. These bottom assembly lights include power and switch components (not shown) for turning the bottom lights on and off as desired. A translucent diffusion plate 174 is preferably positioned under the object support plate 172 and mounted in lower portion 156 of frame 154. The diffusion plate 174 disperses light from the bottom light assembly uniformly over the entire surface area of the object support plate 172.

Figure 6:
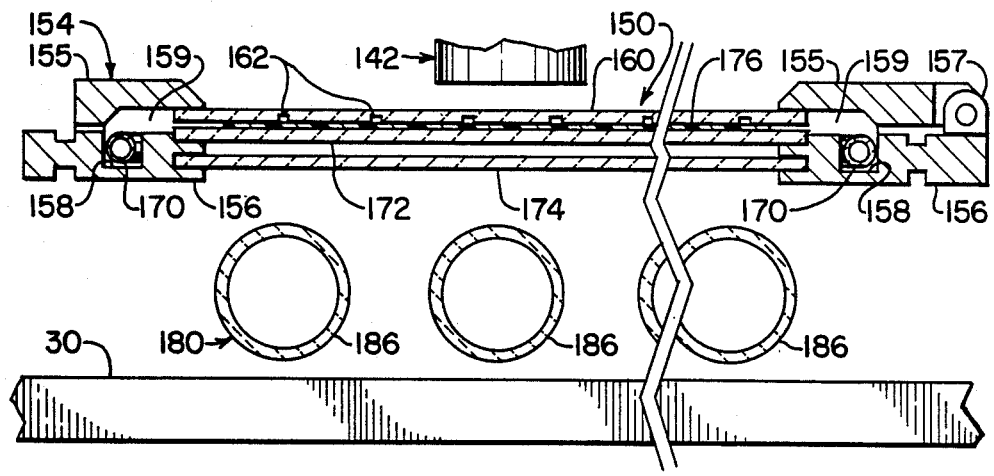
FIG. 6 is a cross-sectional view taken along lines 6—6 of FIG. 2 to show the reseau support structure and lighting components.
Figure 7:
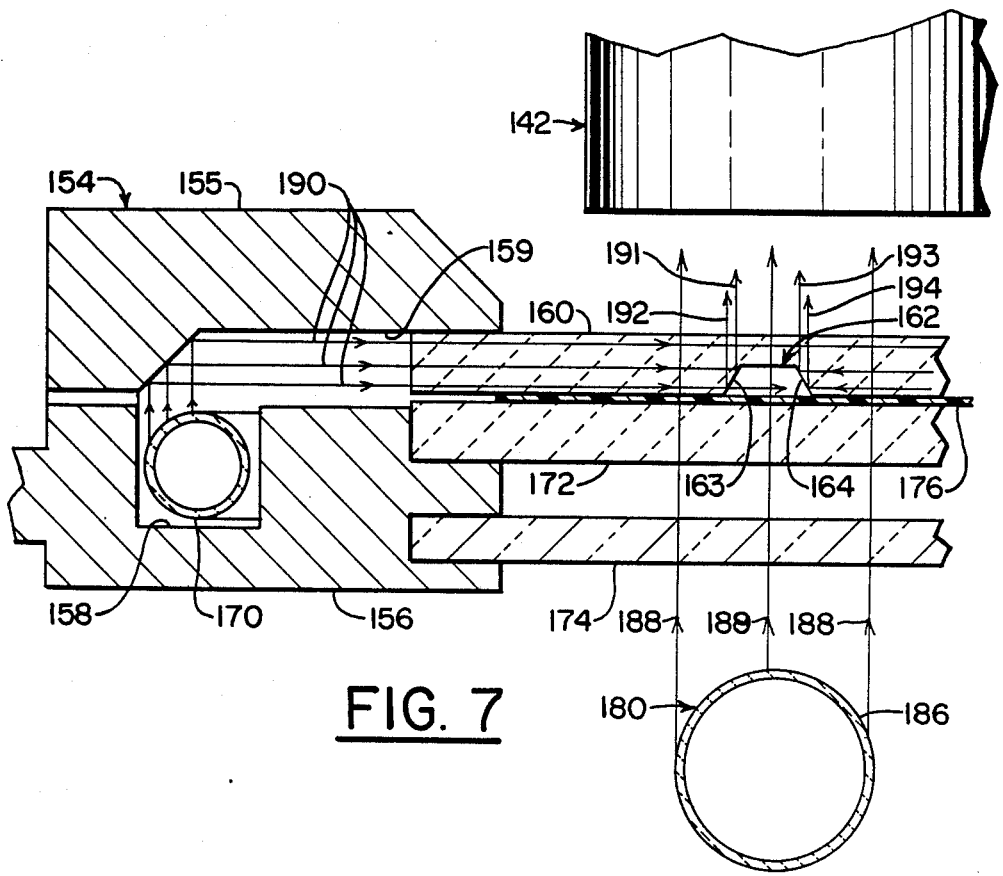
FIG. 7 is an enlarged view of the left side of the reseau support apparatus and lighting components shown in FIG. 6 to illustrate the lighting functions of the components of this invention.

As best shown in FIGS. 6 and 7, with secondary reference to FIG. 1, the reseau assembly 150 also includes a side light source preferably in the form of a fluorescent light tube 170 positioned in a trough 158 in the bottom section 156 of frame 154 and extending around the perimeter of the reseau plate 160. A light canal 159 in the form of a space between the upper and lower sections 155, 156 of frame 154 allows light rays 190 from the side light 170 to reach the edge of reseau plate 160.

Figure 8:
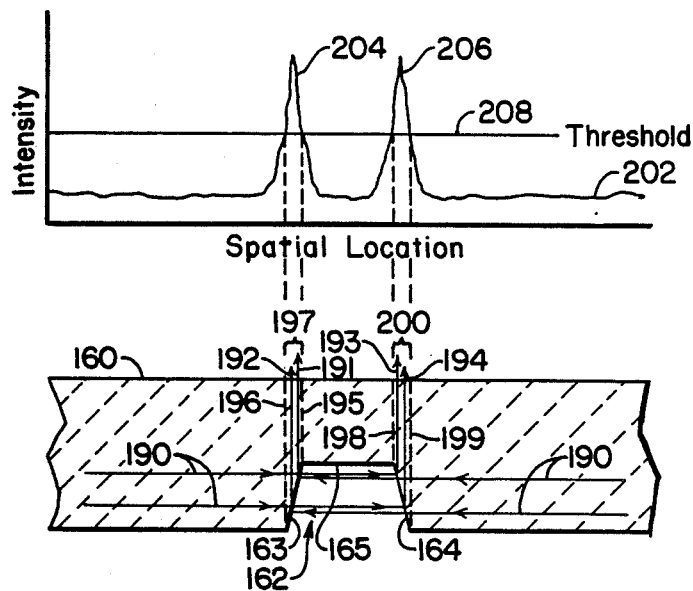
FIG. 8 is an enlarged cross-sectional view of the grid groove shown in FIG. 7 along with a plot of light intensity associated with the grid structure.

A significant feature of this invention is the combination of the structure of the grid marks 162 with the sidelights 107 to make the grid marks visible or invisible as desired. Referring now to FIGS. 7 and 8, the preferred grid mark structure 162 of the present invention is in the form of a "+"-shaped groove precision etched into the bottom surface of the reseau plate 160. The bottom surface is preferred so that the grid marks are positioned directly on the optical plane of the object 176, thus eliminating fuzziness due to focusing on the plane of the object. These etched grooves preferably have a generally trapezoidal cross-sectional configuration with generally inwardly slanted opposite sidewalls 163, 164 intersected by a generally flat top wall or surface 165. The width of the open bottom of the groove is preferably in the range of 25 to 100 $\mu$m, and the depth of the groove is preferably in the range of about 2 to 10 $\mu$m.

Because of the shape of the groove of this reseau grid mark 162, a substantial part of the light rays 190 directed horizontally through the plane of the transparent reseau plate 160 from the side lights 170 are reflected and refracted upwardly from the slanted sides 163, 164 of the reseau mark groove 162. The upwardly reflected and refracted light rays from the slanted surface 163 are indicated schematically in FIG. 8 as light rays 191, 192. Likewise, the upwardly reflected and refracted light rays from slanted surface 164 are indicated schematically as rays 193, 194.

These upwardly directed light rays 191, 192 from slanted surface 163 and light rays 193, 194 from the slanted surface 164 are directed into the lens 142 positioned over the surface of the reseau plate 160. The CCD or CID detectors in a rectangular array in the solid state camera 140 (not shown in FIGS. 7 and 8) can, of course, detect the spatial positions and intensities of these upwardly directed light rays 191, 192, 193, 194 very accurately, particularly when the bottom lights 180 are turned off so that the only source of light is from the side light 170. As shown in FIG. 8, a plot 202 of light intensity in relation to spatial location on the edge of a transverse plane cutting through the grid mark 162 as "seen" or detected by the solid state camera 140 results in two peak intensities 204, 206 spaced apart from each other in the same spatial distance as the distance between the slanted sides 162, 164 of the etched reseau groove 162.

Figure 9:
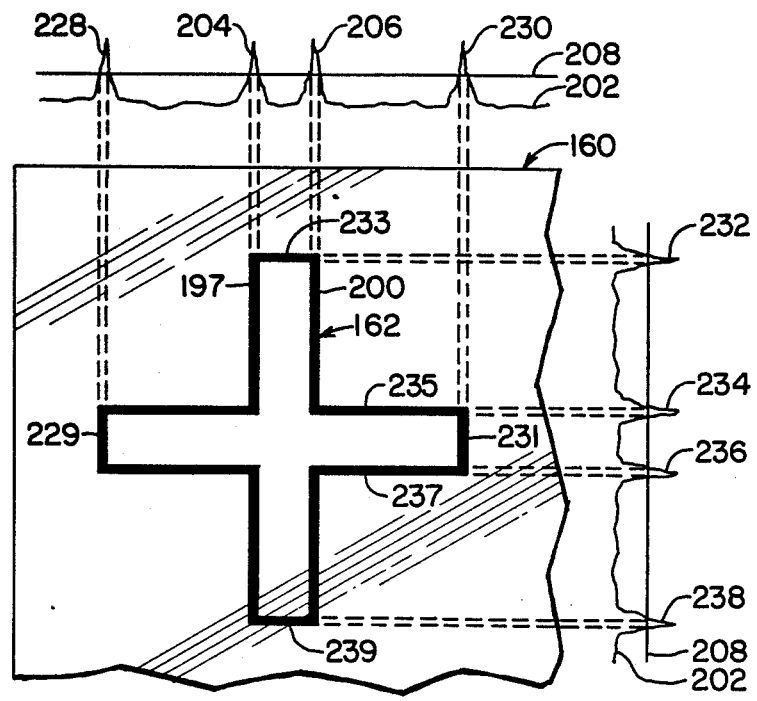
FIG. 9 is an enlarged plan view of a computer image of the reseau grid of FIG. 8 according to the present invention.

Such a solid state camera "view" in terms of light intensity can be converted to digital data corresponding to specific pixel locations on the surface of the reseau plate 160 for processing. The processing can include setting a threshold intensity 208 above which the peak intensities 204, 206 are recorded and stored by computer in correlation with their spatial locations, and below which the intensities are ignored. The resulting image recorded and stored in the computer, therefore, corresponds to the edges of the grid mark grooves 162. The edge boundaries 195, 196 of the recorded peak 204 above the threshold 208 can essentially correspond with the lateral extremities of the slanted surface 163 so that the width between the boundary edges 195, 196 represents the width 197 of the spatial location recorded on that side of the reseau grid mark 162. Likewise, the edge boundaries 198, 199 of the peak 206 above the threshold 208 correspond generally with the lateral extremities of the slanted surface 164 and define the width 200 in spatial location of that side of the grid mark 162. The resulting data and computer memory therefore corresponds with the boundary lines of the grid mark 162, as illustrated in FIG. 9. As described above, the intensity peaks 204, 206 correspond with the grid mark boundary lines 197, 200. Likewise, additional intensity peaks 228, 230, 232, 234, 236, 238 correspond in spatial location with boundary lines 229, 231, 233, 235, 237, 239, respectively, of the grid mark 162.

An alternate embodiment grid mark 162' is shown in FIG. 10. This alternate grid mark 162' is similar to the preferred embodiment grid mark 162 described above in that it is formed by etching a groove into the bottom surface of the reseau plate 160. However, in this alternate embodiment grid mark 162', the side surfaces 163', 164' and the top surface 165' are etched in such a manner that they are more rough and irregular instead of substantially smooth surfaces. Therefore, the light rays 190 traveling longitudinally through the transparent reseau plate 160 from the sidelights 170 are more scattered as they are reflected and refracted generally upwardly through the top surface of the reseau plate 160. For example, as illustrated in FIG. 10, the scattered generally upwardly directed light rays 210 result from the longitudinal light rays 190 incident on the right side 163' and top 165' of the etched grid mark 162'. Likewise, the generally upwardly directed scattered light rays 212 result from the longitudinal light rays 190 incident on the right side 164' and top 165' of the grid mark 162'. As a result, the light intensity "seen" or detected by the solid state camera 140 may still have two spaced apart peaks 222, 224 generally corresponding in spatial location with the sides 163' 164' of grid mark 162', but the intensity 223 between the two peaks 222, 224 also remains substantially higher than the background light intensity level 220. Therefore, the threshold intensity level 226 can be set between the valley intensity level 223 and background intensity level 220. In this manner, the recorded spatial locations of pixels having light intensity greater than the threshold 226 is bounded by the edges 214, 215 corresponding to the entire width 216 of the grid mark 162'. The result, as shown in FIG. 11, is that the spatial conditions recorded by the solid state camera where the light intensity is above the threshold 226 corresponds with the entire width of the grid mark 162' showing as a broad line 216. Similar light intensity levels at peaks 262, 264 and the valley 263 therebetween above the threshold 226 are recorded in the computer memory as the broad line 265 corresponding with the cross portion of the grid mark 162'. Consequently, the grid mark 162' stored in the computer memory as the full width grid mark 162' rather than just the borderlines of the grid mark that were shown for the preferred embodiment 162 in FIG. 9.

An advantage of the grid marks 162 and 162' as described above is that after they have been recorded in the computer memory, they can essentially become invisible so as not to interfere with or block out any part of the image on the object film, transparency, or photograph 176 as its image is being digitized and recorded in the computer memory. These grid marks 162 and 162' can be made invisible simply by turning off the side light 170. Because the slanted sides 163, 164 are fairly steep, there is virtually no noticeable interference with the light rays 188 produced from the bottom light 180, as shown in FIG. 7, as those bottom light rays 188 travel upwardly through the reseau plate 160 to the camera lens 142. Therefore, after the object 176 is positioned on the object support plate 172 and the reseau plate 160 is positioned on top of the object 176, the whole assembly can be clamped into position with the top portion 155 of frame 154. Then, with the bottom light assembly 180 turned off and the sidelights 170 turned on, the camera 140 can be turned on to detect the precise position of the grid marks 162 or 162'. This data corresponding with the positions of the grid marks 162 or 162' is then sent to and stored in the computer memory. After the grid mark positions have been recorded and stored in computer memory, the sidelights 170 are turned off and the bottom lights 180 are turned on. With the sidelights 170 off and the bottom lights 180 on, the camera 140 can be used to detect the light intensities of the bottom light rays 188 allowed through the various parts of the object 176 as dictated by the image thereon, which intensity data is then sent to the computer processed and put into computer memory as digital data corresponding with the image on the object 176. As mentioned above, this data corresponding with the image on the object 176 does not include the data corresponding to the grid marks 162 or 162'. Therefore, the entire image detected from the object 176 is recorded in memory without any portion thereof being blocked out or interfered with by the grid marks 162 or 162'. Yet the computer memory has stored therein data relating to the precise spatial location of the grid marks 162 or 162' in relation to the image from the object 176 for use in locating, scaling, measuring, analyzing, correlating, or displaying the image in precise terms.

Figure 12:
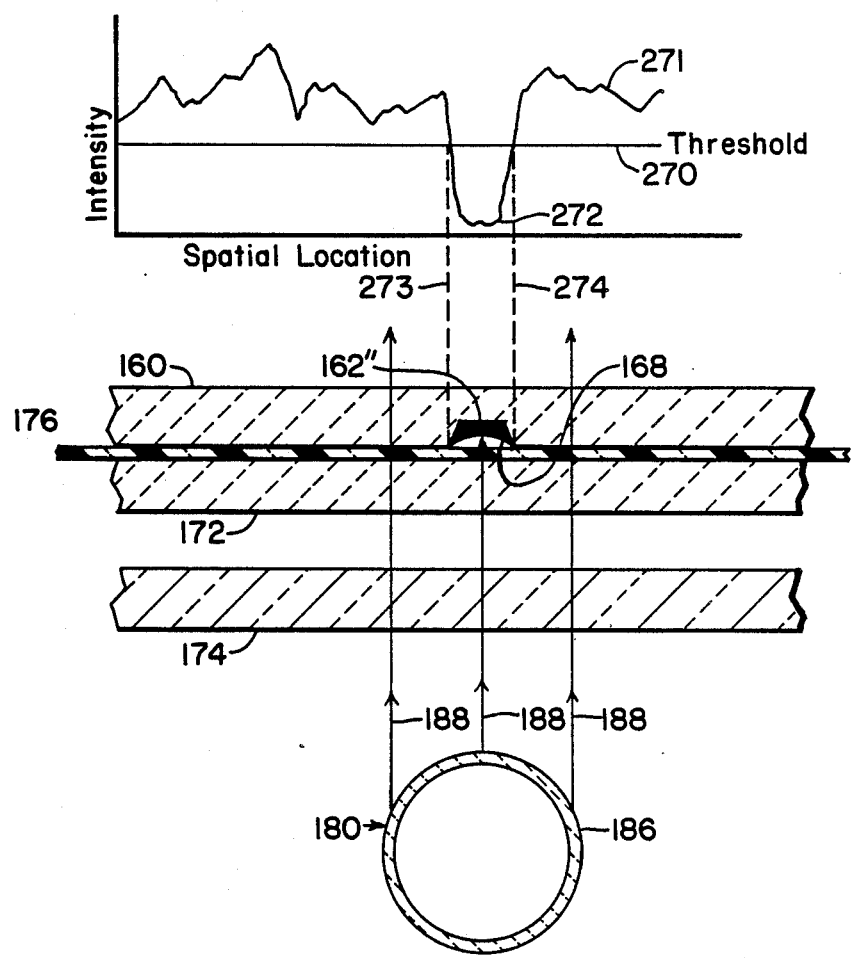
FIG. 12 is an enlarged cross-sectional view of still another alternate embodiment ink-filled grid mark according to this invention.

Another alternative embodiment grid mark 162" according to the present invention is shown in FIG. 12. This alternative grid mark 162" is made by etching a groove into the bottom surface of the reseau plate 160, similar to that described in the preferred embodiment grid mark 162 shown in FIG. 8 above. However, in this alternate embodiment grid mark 162", the groove is filled or partially filled with an opaque substance, such as ink 168. Therefore, the light rays 188 emanating from the bottom lighting system 180 cannot pass all the way through the reseau plate 160 to reach the camera 140 where those light rays 188 are blocked by the opaque ink 168 in the grid mark 162".

Consequently, as shown by the plot 271 in FIG. 12, the intensity of the light detected by the solid state camera falls off almost to zero, as indicated by the valley 272 in the plot 271 where the light rays 188 are blocked by the grid mark 162". The computer can be programmed, therefore, with a threshold intensity level 270 below which the computer will recognize it as a grid mark. As a result, the spatial location between the broken lines 273, 274 can be interpreted by the computer to correspond with the grid mark 162". While this alternate embodiment opaque grid mark 162" is functional, it has the disadvantage of also blocking out and making illegible any part of the image on the object 176 that happens to lay just under the grid mark 162". Of course, the sidelights 170 are not required for use of this alternate embodiment grid mark 162".

Figure 15:
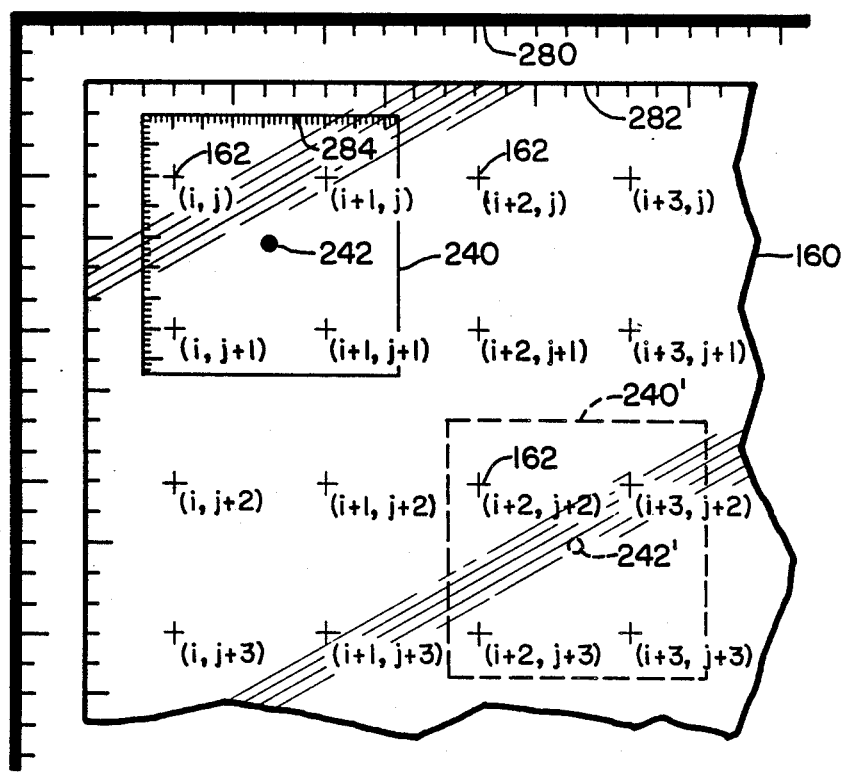
FIG. 15 is an enlarged fragmentary view of a corner of the reseau plate and grid marks with an image frame shown at a home position and with an alternate position image frame shown in broken lines and illustrating the three coordinate systems of the present invention.

Three planar coordinate systems are used in association with mensuration operations with the apparatus 10 according to this invention. These three coordinate systems are illustrated in FIG. 15 in conjunction with the reseau plate 160, grid marks 162, and a view frame 240 as "seen" by the camera. First, there is a table coordinate system, indicated at 280, which is a measure or indication of the physical position or spatial location of the camera 140 and lens 142 on the X-axis and Y-axis in relation to the table 11 and platform 50. Specific locations of the camera 140 and lens 142 on this table grid system are indicated by either (1) keeping track of stepper motor turns, which result in specifically measured linear movement increments, or (2) locator devices, such as electro-optic devices (not shown) mounted on the structure. Second, there is the image coordinate system, indicated at 282, which is a measure or indication of the spatial locations of parts of the image in relation to other parts of the image or to a benchmark on the image. Specific locations on this image coordinate system 282 are provided by the array of grid marks 162 on the reseau plate 160 as discussed above. Third, the frame coordinate system, indicated at 284, is a measure or indication of the locations of specific pixels of light intensity within the frame "seen" by the solid state camera. Specific locations of pixels in this frame coordinate system are indicated by the specific CCD or CID light sensor element within the array of such light sensor elements in the camera. As discussed above, typical chips commonly used in solid state "frame grabbing" cameras have a plurality of light sensor elements arranged in rectangular two-dimensional arrays of, for example, 510×492, although arrays of 1000×1000 light sensors are also coming available. These three coordinate systems 280, 282, 284 are all synchronized and utilized together according to this invention, to achieve precise spatial integration and mensuration of parts or all of the image on an object 176. In addition, the position of the camera 140 and lens 142 in the Z-axis is also integrated with these planar coordinate systems for magnification and scale used in a particular operation or image analysis.

As discussed above, the camera 140 and lens 142 are driven to desired positions in the X-Y plane on the table coordinate system by the X-axis drive apparatus 70 and the Y-axis drive apparatus 90. The lens 142 is driven upwardly and downwardly in the Z-axis direction in relation to the camera 140 by the lens carriage drive assembly 130. The camera 140 and lens 142 are driven in unison upwardly and downwardly in the Z-axis direction by the lens carriage drive apparatus 110. Each of these drive apparatus 70, 90, 110, 130 has a stepper motor 72, 92, 112, 132, respectively, with an encoder mounted on each stepper motor to detect motion of the respective motor shafts. An accurate record of rotation increments of each stepper motor is available from each respective stepper motor controller, which is a standard component of known stepper motor systems.

Each of these drive apparatus 70, 90, 110, 132 also has a home position locator or sensor to detect when the drive apparatus, thus the component driven in the X, Y, or Z axis, is in a "home" position. These home position locators or sensors 600, 610, 620, 630 are shown in the drawing in FIGS. 2, 4 and 5. They can be in the form of sensors such —; as opto-interruptors, magnetic read switches, or and the like which are well-known and readily available items. For example, the X-axis "home" position sensor 600 in FIG. 2 can include an LED 604 and a photodiode 606 be mounted in spaced apart relation to each other on the bracket 79 of the platform 50, and an opaque object or interruptor 602 can be mounted on the frame member 20 in alignment with the space between the LED 604 and the photovoltaic cell 606 and adjusted so that it blocks the light from the LED 604 from reaching the photodiode 606 when the "home" X-axis position of the platform 50 is reached. The interruption of light is detected and can be processed to a "stop" signal in a manner known to persons skilled in the electronics art for deactuating or turning off the stepper motor 72. Likewise, the opto-electronic "home" position sensor 610 for the Y-axis can be mounted on the platform 50 and channel member 82 for turning off the stepper motor 92 when the Y-axis "home" position is reached, as shown in FIG. 5. Specifically, the "home" position sensor 610 for the Y-axis can include an LED 614 and a photosensor 616 mounted under the angle member 88, and an opaque interruptor 612 can be mounted on the inside surface of frame member 58 of platform 50. Opto-interruptor sensor 620 constructed similar to sensors 600 and 610 can be mounted on the channel member 82 and camera carriage assembly 100, as shown in FIG. 4, for turning off stepper motor 112 when the camera Z-axis "home" position is reached. Likewise, opto-interruptor sensor 630 can be mounted on the camera carriage assembly 100 and the lens carriage assembly 120 for turning off stepper motor 132 when the lens Z-axis "home" position is reached.

Figure 13:
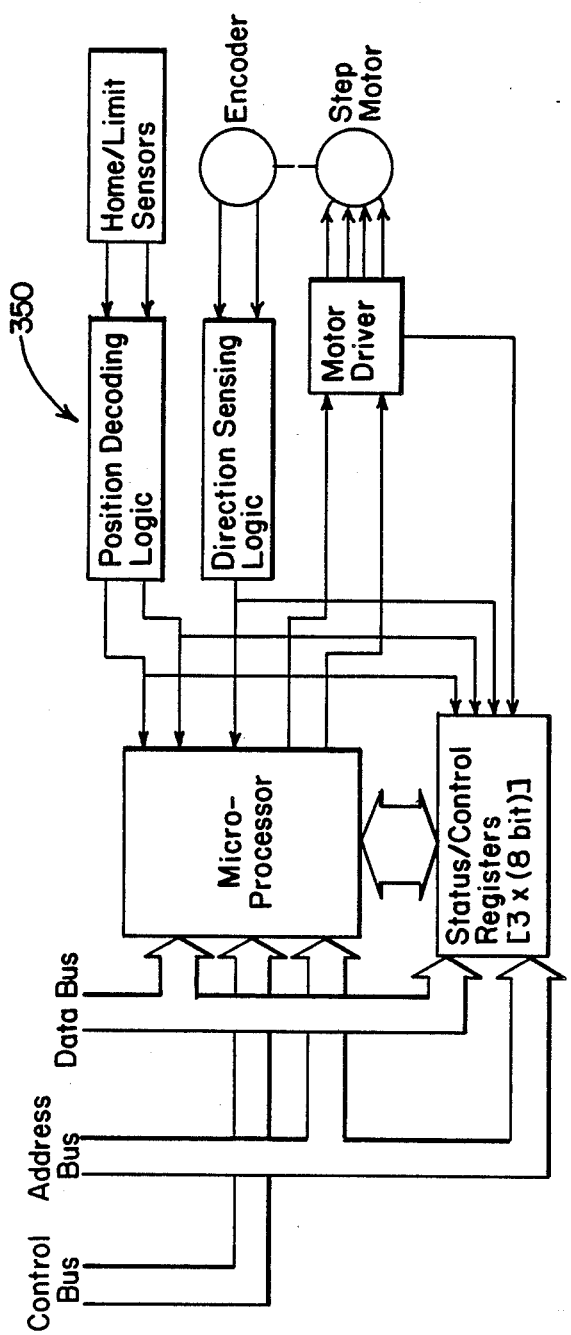
FIG. 13 is a block diagram of an axis position controller of the present invention.

An axis position controller system 350 is illustrated in the block diagram of FIG. 13. One of these controller systems 350 can be used for each drive apparatus 70, 90, 110, 130. These axis position controller systems 350 not only control the physical positions of the camera 140 and lens 142 in the X, Y, and Z axes, but they also provide the spatial location and magnification data to the computer system 100 for use along with the pixel position and light intensity data from the solid state camera 140 in mensuration and image display functions.

Figure 14:
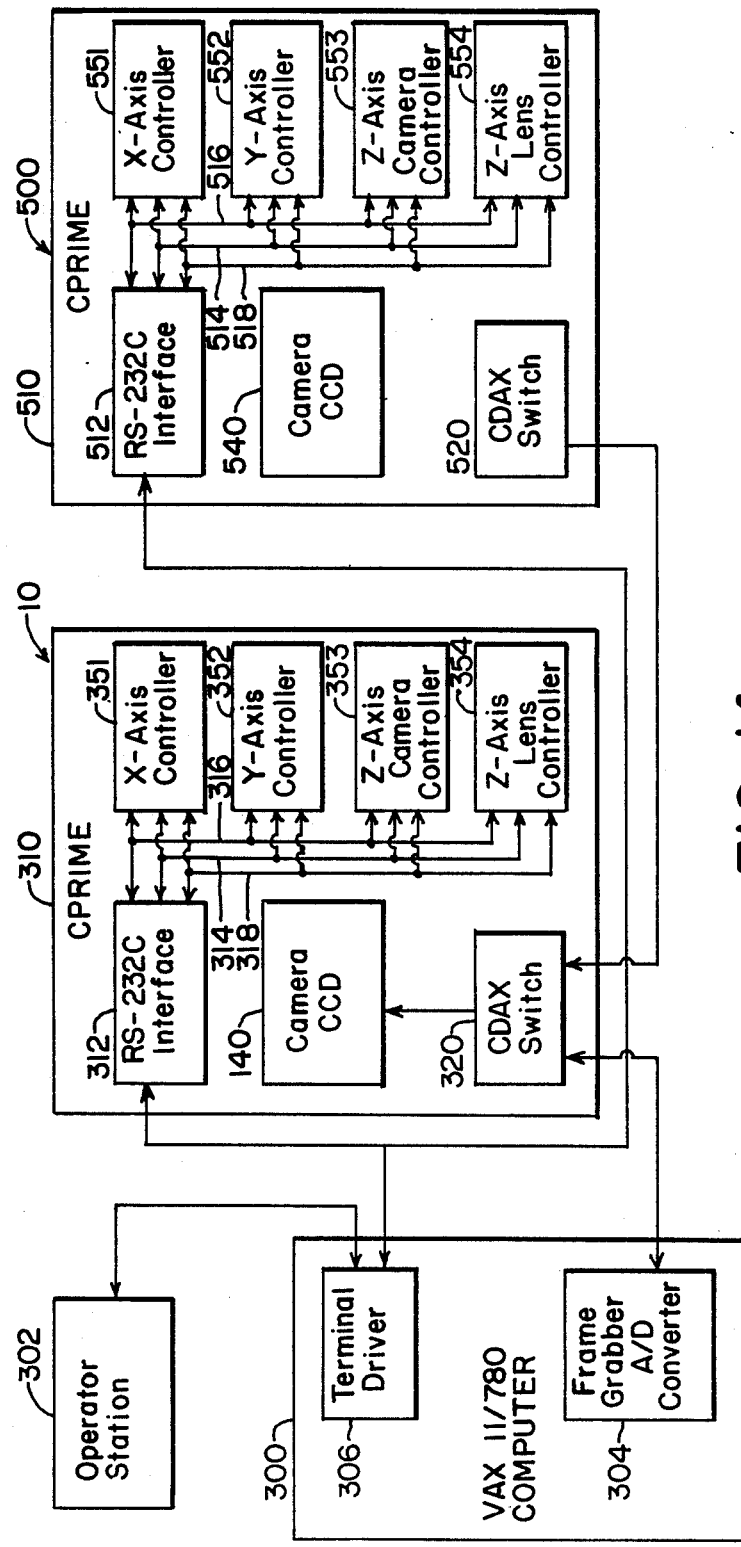
FIG. 14 is a block diagram of the entire data information system of the present invention.

A block diagram of a control system 310 called "CPRIME" according to this invention interfaced with a VAX 11/780 computer system 300 is shown in FIG. 14. This operator system 310 for the mensuration frame grabbing apparatus 10 includes four axis position controller systems 350, such as that shown in FIG. 13—one for each drive system. For convenience in describing this control system 310, the X-axis controller system is designated 351, the Y-axis controller system is designated 352, the camera Z-axis controller system is designated 354. Thus, the X-axis controller system 351 controls the X-axis drive 70, the Y-axis controller system 352 controls the Y-axis drive 90, the camera Z-axis controller system 353, controls the camera carriage drive 110, and the lens Z-axis controller system controls the lens shelf drive 130. A standard interface 312, such as an RS-232C interface, is provided to connect the terminal drive 306 of computer 300 to the controllers 351, 352, 353, 354 via the address bus 314, control bus 316, and data bus 318. The camera 140 is connected through a CDAX switch 320 to the frame grabber analog-to-digital converter 304, such as a Gould FD-3000 (trademark), can be a component of the computer system 100. An operator station 302, preferably comprising a keyboard and a CRT or graphical display device, is also connected to the terminal driver 306 of the computer 306.

As mentioned above, where stereo mensuration or comparator mensuration is desired, two twin mensuration frame grabbing systems 10 according to the present invention are used. The second of the twin system 500 is not illustrated in detail because it can be essentially identical to the mensuration frame grabbing system 10 described in detail above. However, the control system 510 for the twin mensuration frame grabber system 500 is shown in the schematic diagram of FIG. 14 tied into the computer system 100 in the stereo embodiment according to this invention. Specifically, the control system 510 of the twin mensuration frame grabbing system 500 is shown in FIG. 14 much the same as the control system 310 of the mensuration frame grabbing 10. It includes four axis controllers, an X-axis controller 551, a Y-axis controller 552, and a lens Z-axis controller 554, for controlling the corresponding X-axis, Y-axis, camera carriage, and lens shelf drives (not shown) of the twin mensuration frame grabbing system 500. An interface 512 connects the controllers 551, 552, 553, 554, via address bus 514, control bus 516, and data bus 518 to the terminal driver 306 of computer 300. Also, the solid state camera 540 of the twin mensuration frame grabbing system 500 is connected to the frame grabber A/D converter 304 through the CDAX switch 320.

In order to obtain meaningful data from the mensuration frame grabbing system, it is necessary to orient the image with the table coordinate system. This initializing or "inner orientation" is accomplished after the object 176 and reseau plate 160 are loaded in the frame 154 and mounted in the table 11 by allowing the camera to seek its "home" position as defined by the opto-interrupter limit sensors mounted on the structure as described above. This "home" position in the X-Y plane establishes a zero point on the table coordinate system in the X and Y axes.

In stereo mensuration, the bottom lights 180 are switched on and the side lights 170 are initially switched off as the camera 140 of one of the twin mensuration frame grabbing systems 10 is driven in the mono mode by drives 70, 90 over its respective reseau assembly 150 until it is focused on the desired photo or other image area of the respective object 176. As the camera 140 moves, it grabs a frame of a portion of the image about every 1/30th of a second. These image frames are constantly viewable on the computer CRT 302, so the operator can see when the camera 140 is focused on the desired image area on the object 176.

Once the camera 140 of the first frame grabbing apparatus is focused on the desired image area, that image is grabbed and stored in computer memory and displayed on the CRT of the operator station 302. Then the bottom lights of the other of the twin mensuration frame grabbing systems 500 are turned on, and the camera of the system 500 is driven over its respective reseau assembly, which contains the photograph or other hard copy image that is the stereo conjugate of the photograph or other hard copy image that is mounted in the reseau assembly of the first system 10 until the camera of the second system 500 is focused on the corresponding image area. During this process, the digital data of image frames grabbed by the twin system 500 is merged by the computer and displayed together with the computer stored image grabbed by the first system 10. In this manner, stereo parallax removal from the two conjugate stereo images can be accomplished easily and precisely by the operator viewing the superimposed conjugate images, in spite of the somewhat less precise mechanical positioning information available from stepped increments of the respective axis drives. In other words, while the respective cameras 140, 540 of the twin mensuration frame grabbing systems 10, 500 can be driven to about the same positions, either separately or concurrently, to the desired image area of the conjugate films to be viewed and analyzed, the precise conjugate position of the second camera 540 over the desired image area on the film in relation to the position of the first camera 140 does not have to be accomplished by precise placement of the respective conjugate films in the respective frame grabbing apparatus 10, 500 or by precisely coordinated and measured movement of the respective cameras 140 540 to those conjugate areas of the films. Further, stereo-parallax removal does not have to be accomplished by the common, but slow and cumbersome method of shifting one of the images by software and rewriting it to the display, which is far too slow for real-time stereo-parallax removal. Instead, stereo-parallax removal is accomplished according to the present invention by hardware scroll, i.e., moving the second camera 540 in relation to the image of the desired area grabbed by the first system 10 and stored in computer 100 as both this stored image from the first system 10 and the image from the scrolling second camera 540 are displayed together superimposed on each other. In this manner, the operator can see on the CRT precisely when the conjugate image areas on the respective films or other objects on each of the two mensuration frame grabbing apparatus 10, 500 come together in a precise, sharply focused, stereo image.

When both of the cameras are stopped on the desired stereo-viewable pair of conjugate images, the bottom lights 180 are turned off for a short time, so there is no film illumination. Simultaneously, the side lights 170 are turned on for grid illumination. With the side lights 170 on, each camera 140 "grabs" a frame at the location where it was stopped, thus grabbing an image of the grid marks 162 within the frame "seen" by the camera 140. Each camera 140 feeds that "grabbed" image of the grid marks 162 to the computer. The computer can discern the specific spatial locations of the grid marks 162 in the frame coordinate system by the specific pixels or CCD light sensors in the CCD array in the camera 140 that sense the grid marks 162. Therefore, the grid marks 162 are automatically located within the frame and frame coordinates are computed. These frame coordinates are then used to compute coefficients of transformation for transforming the spatial locations of the grid marks 162 within the "grabbed" frame to table coordinates in relation to the "home" position using the known table coordinates of the grid marks. Thereafter, the grid marks 162 provide the image coordinate system so that any portion of the object 176 image within a "grabbed" frame that includes any grid marks 162 can be located in precise spatial orientation to other image portions "grabbed" or to the "home" position. The spatial measurements of subsequent camera 140 movements by the encoder input and direction sensing logic shown in FIG. 13 need only be accurate enough for the microprocessor to determine which grid marks 162 are within the subsequent "grabbed" frames.

Since the sizes and distances between all the grid marks 162 etched into the reseau plate 160 are known very precisely and are also fed into the computer, the computer can precisely check and adjust the exact spatial locations of grid marks 162 in the subsequently "grabbed" frames to the grid marks 162 in previously "grabbed" frames or to the "home" position. In other words, using the coefficients of transformation and the known table coordinates of the grid marks 162, the image coordinates and segments "grabbed" can be related geometrically to the table coordinate system.

After the image of the grid marks 162 within the "grabbed" frame for each camera 140, 540 are stored in computer memory, as described above, the side lights 170 are turned off, and the bottom lights 180 are turned back on. Then, without moving the cameras 140, 540 the same frame positions are "grabbed" again, this time "grabbing" the portion of the object 176 image within the frame. This image within the frame "grabbed" by each camera 140, 540 is also sent to the computer 100 with each feature of the image "grabbed" being sensed in pixels by light intensity focused on individual CCD light sensors in the CCD array of each of the cameras 140, 540. Therefore, each camera 140, 540 feeds two images to the computer 100 for each frame position, i.e., the grid mark 162 image within the frame and the portion of the object 176, image within the frame. Since the cameras 140, 540 do not move between "grabbing" these two images, the grid marks 162 are in computer memory in precise spatial position on the "grabbed" segment of the object 176 image. However, since they were "grabbed" separately, first one and then the other, the grid marks 162 to not block out or distort any part of the object image.

If the system has been initialized properly, as described above, such as by observation of a benchmark or even the film edge, the table coordinates can be transformed into film or image coordinates. For example, as illustrated in FIG. 15, if a frame 240 was "grabbed" at the "home" position, illustrated by dot 242 in the center of the frame 240, five grid marks 162 are "grabbed" in the frame 240. Each of those grid marks 162 are recognizable by the computer as being the grid marks 162 expected to be in a frame "grabbed" at "home" position 242 by the general positioning of the reseau plate 160 in the table 11. Even if the reseau plate 160 is not placed precisely in the same place each time, it is close enough if it is placed so at least the same reseau grid marks 162 can be captured within a frame "grabbed" at "home" position 242. This is not to say that a frame has to be "grabbed" at "home" position each time the apparatus 10 is initialized, but it could be used as a check on proper reseau plate 160 positioning. As long as the reseau plate 160 is positioned each time close enough that the same grid marks 162 would be in the frame "grabbed" at "home" position if such a frame was "grabbed", spatial positions can be taken from any other grid marks 162 that appear in any other frame "grabbed" over other parts of the reseau plate 160, because the spacings and sizes of all the grid mark 162 on the reseau plate 160 are known precisely.

To illustrate further, the four grid marks 162 "grabbed" in frame 240 at "home" position 242 in FIG. 15 are not shown exactly centered in the frame 242. However, since the camera 140 is centered on the "home" position 240 and the frame coordinate system is fixed by the CCD array in the camera, the actual pixels in which the five grid marks 162 in frame 240 can be fed to the computer 100, and a correction factor can be determined to "adjust" the positions of the grid marks 162 by software to ideal positions as if they were centered exactly around the "home" position 242, i.e., initializing the image coordinate system to the table coordinate system. Then, when the camera 140 is moved by stepper motors 72, 92 to an alternate position and a frame 240 is grabbed at that alternate position, the encoders of the stepper motors, 72, 92, along with the logic illustrated in FIG. 13, will keep track of distances and directions the camera 140 is moved. By correlating those distances and directions with the known spatial settings of the grid marks 162 on the reseau plate 160 and keeping track of each such grid mark 162, e.g., by sequential (i,j) numbers in a cartesian coordinate system, and by applying the correction factor determined above, the computer will know or recognize which grid marks 162 show up in the image "grabbed" in the alternate frame 240. Since the (i,j) image coordinates of those grid marks 162 within alternate frame 240 are known along with their precise spatial position from "home" position, the computer can further correct or update actual table coordinates and pixel locations in relation to the image coordinates at that alternate "grabbed" frame 240 location. Therefore, when the side light 170 illumination of grid marks 162 is turned off and the bottom light 180 is turned on, the image segment "seen" by the camera 140 can be loaded precisely in spatial relation to any other "grabbed" image segment.

Also, once the stereo initialization is completed, the cameras 140, 540 can be moved over the two conjugate images, respectively, and, upon stopping the cameras 140, 540 over a desired image segment, proper table and image coordinates for each pixel of the image segment can be obtained as described above so that stress-free stereo observation is feasible. Then, mensuration of image points can be done with a movable cursor in the digital image display. The image display is fixed or frozen in a desired scale, and the cursor movement is scaled to correspond with the scale of the image. As the cursor is moved over the frozen image, the distances moved to scale can be displayed.

The mono-comparator mode of operation differs from the stereo mensuration mode described above only in that a single mensuration frame grabber apparatus 10 is used instead of two of them. The purpose of the mono-comparator mode is to create image coordinates of features that are desired to be analyzed or measured. A movable cursor can be used to point to specific points or features in a fixed or frozen image segment "grabbed" by the camera 140 and for mensuration of features in the image. The cursor can be moved manually or by automatic sweep to a target feature using pattern recognition. Transformation of pixel or frame coordinates into table coordinates and further into image coordinates is based on the reseau grid marks 162 and their automatic detection as soon as the camera 140 stops in the same way as described above for the stereo mensuration mode. This procedure is applicable at any of the available magnifications.

Figure 16:
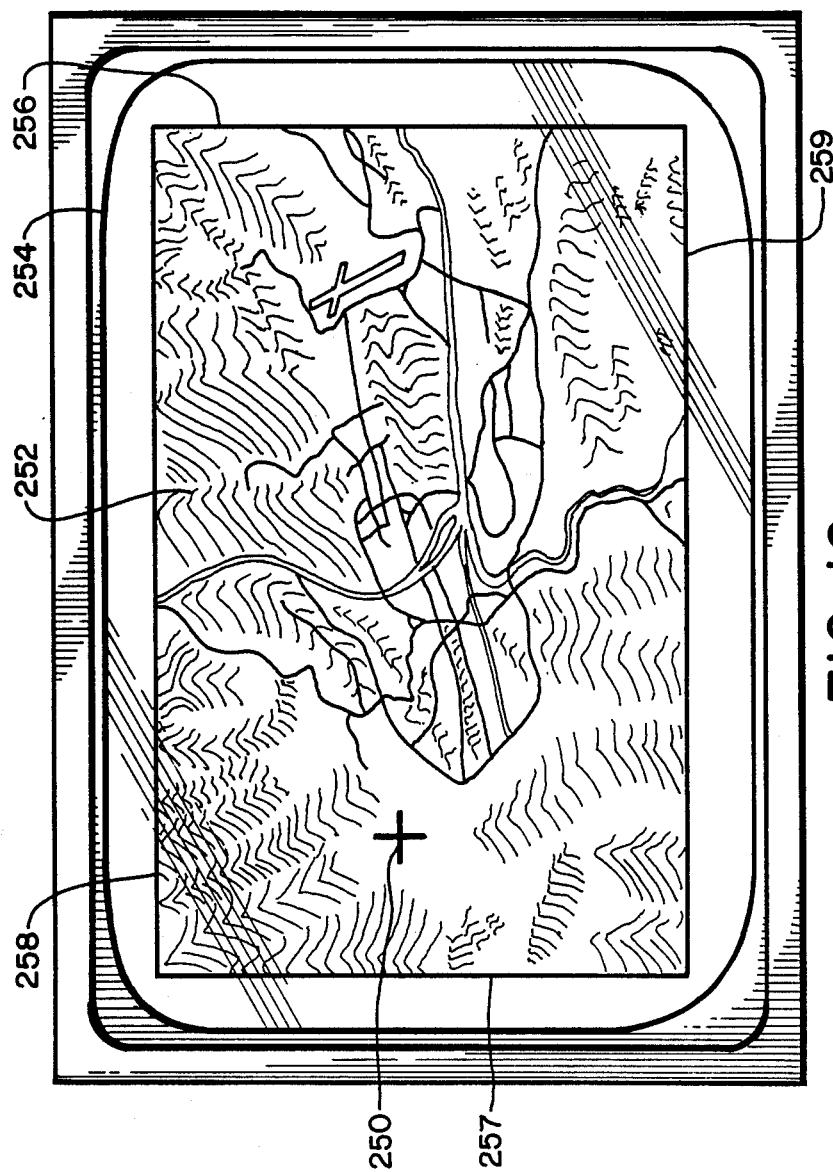
FIG. 16 is a front elevation view of a CRT and cursor display of a digitized image according to the present invention.

The comparator cursor movement in the CRT display window and the camera movement are smoothly controlled and coordinated according to this invention in such a manner that the cursor can be moved within a display window on the CRT of the grabbed image by appropriate user controls and, when the cursor reaches an edge of the display window, the X-axis and Y-axis drives 70, 90 start to drive the camera 140 over the film or object 176 as the CRT simultaneously displays real-time video scroll images as the camera 140 moves. In other words, as illustrated in FIG. 16, the computer-generated cursor 250 is movable by the operator in any X or Y direction within the display window 252 of a CRT 254. Such movement can be controlled by a joystick switch, omni-directional ball switch (commonly called a "mouse"), designated keys on a keyboard at the operator station, or the like. Such cursor control switch devices are well-known in the computer art and need not be described in detail here. When the cursor 250 is moved to display window limit or margin, such as the right margin 256, the X-axis controller 351 actuates the X-axis drive 70 to move the camera 140 to the right. As the camera 140 moves to the right, it grabs images about every 1/30th of a second and continuously displays those images in a real-time scroll over the film or object 176 until the camera reaches the desired spot and the CRT 254 displays the desired image. The joystick or other control switch can then be manipulated to move the cursor away from the margin 256 and back into the display, at which time the controller 351 deactuates the drive 70 and stops the movement or translation of the camera.

Of course, movement of the cursor into other margins causes the camera to move or scroll in other directions. For example, movement of the cursor 250 to the left margin 257 actuates X-axis drive 70 to move camera 140 to the left. Likewise, movement of the cursor 250 to either the top margin 258 or the bottom margin 259 actuates the Y-axis drive to move the motor in those respective Y-axis directions.

When the camera 140, is positioned to display the desired image, the side lights 170 are flashed to capture the grid image, the precise camera orientation with respect to grid marks 162 are determined and calibrated, as described above, and the cursor position can be calibrated to grid marks 162. Therefore, the cursor position coordinates can also be displayed. This operation can be programmed to occur upon pressing a designated "select" button or key on the keyboard (not shown). Succeeding cursor position coordinates calibrated to the scale and magnification of the image display can be used in making precise measurements of objects or spatial relationships in the display.

The above-described motion and display sequence appears on the display CRT 254 as a smooth operation, without spatial jumps in the course location or in successive image display during scrolling. It is also done quite conveniently with a minimum of operator controls or special training.

This frame grabbing apparatus 10 can also be used to build up and store a large pixel array. For example, if an entire 20"×10" (50 cm×25 cm) film image needs to be digitized and stored, a series of adjacent frames of the image and reseau grid marks 162 can be grabbed, coordinated to one precise table and then to a precise composite image coordinate system, and then stored in computer memory. Such a 20"×10" (50 cm×25 cm) image may require an array of 40,000×10,000 pixels of 12.5 $\mu$m diameter. Since a solid state camera 140 that grabs an array of only about 510×492 pixels in its frame may cover only a fraction of the entire image, the goal is to "grab" a number of adjacent frames, e.g., of about 510×492 pixels and piece or mosaic, i.e., "file", them together to obtain the entire 40,000×20,000 pixel array of the whole image.

This goal can be achieved according to the present invention by sequentially stopping the camera 140 in a systematic raster pattern under software control and "grabbing" adjacent frame segments of the image along with the grid marks 162 on those segments in the respective frames. Then, using the grid marks 162 and image coordinates, the individual frame data can be merged, i.e., "filed", together and converted into digital data for the entire 20"×10" (50 cm×25 cm) image. In the example described above, a mosaic comprised of about 80×40 frames of 510×492 pixels apiece would be required for the 40,000×20,000 pixel array of the entire object image.

Another use of the mensuration frame grabbing apparatus 10, 500 of the present invention is to provide joint analysis and manipulation of separate, but related, image data sets. For example, it might be desirable to compare an older photo or map of an area with a more recent one, perhaps to detect changes or to update available information or images. Such an operation could be conducted in much the same manner as the stereo mensuration operation described above, except that an old image and a new image would be mounted in two separate mensuration frame grabbing apparatus 10, 500, instead of two concurrently photographed images at different angles. Differences or changes between the old and new images can be detected visually on the CRT, or a computer could be programmed to detect such changes automatically.

As mentioned above, the lens 142 and camera 140 combination has a variable magnification capability under manual or computer control. Such variable magnification preferably covers a range of about 12.5 $\mu$m pixels to 125 $\mu$m pixels and still maintain the same logic of operation with automatic recognition of reseau grid marks 162 and automatic transformation of frame coordinates into table and image coordinates. To do so, the reseau plate 160 is designed preferably so that at maximum magnification with the smallest pixel size of about 12.5 $\mu$m, there will be five reseau grid marks 162 in each frame or field of view of the camera 140. Also, at minimum magnification with about 125 μm diameter pixels, the reseau grid marks 162 and their spatial locations still have to be recognizable. The grid marks 162 having generally trapezoidal cross-sections etched into the bottom of the reseau plate 160 as described above are most appropriate for this purpose.

The foregoing description is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. Mensuration frame grabbing apparatus for digitizing an image on an object, comprising:

a table;

a reseau assembly mounted in said table, including an object mounting plate for mounting the object with the image thereon in stationary position in relation to the table, a transparent reseau plate having a plurality of grid marks thereon positioned in precisely calibrated spatial relation to each other, said reseau plate being adapted for positioning on the object mounted on said object mounting plate for holding the object stationary on the mounting plate and for providing grid mark images in precisely calibrated spatial relation to each other for use in correlation with the object image;

a solid state camera positioned over the reseau plate and having a two-dimensional array of light sensor elements, each element being capable of sensing light intensity levels incident thereon independently of the other light sensor elements and outputting a signal indicative of light intensity senses on a real time basis, said camera being oriented to receive light from the object image and the reseau grid mark image;

lens means positioned between the camera and the reseau plate for magnifying the object image and grid mark image as desired and for focusing light rays comprising said images onto said array of light sensor elements in said solid state camera; and translation camera mounting means on said table for mounting said camera and lens means over said reseau assembly and for moving said camera parallel to the reseau plate and object as well as orthogonal to said reseau plate and object;

a table coordinate system, an image coordinate system, and a frame coordinate system, each of which coordinate systems exists in a plane parallel to the planes of the others and which have independent spatial calibrations that can be correlated together to indicate precise mensuration data for any portion and all of an object image digitized by the camera, said table coordinate system being indicative of the position of the camera in relation to the table and the reseau grid marks, said image coordinate system being indicative of the positions of the grid marks in relation to the object image, and said frame coordinate system being indicative of the light sensor elements in the camera array of such elements in relation to the object image and grid marks.

2. The mensuration frame grabbing apparatus of claim 1, including camera position sensing means connected to said translation camera mounting means for sensing the position of the camera in relation to said table and outputting computer readable data signals indicative of the spatial position of said camera in relation to said table, and computer means connected to said camera position sensing means and to said camera for correlating the camera position in relation to said table coordinate system with light intensity data signals output by the light sensor elements in the array in response to grid mark and object image light rays incident on said array of light sensor elements in relation to said frame coordinate system, and further for correlating the digitized object image with the precise mensuration data of the image coordinate system as defined by precise mensuration spacing of the grid marks in relation to each other.

3. The mensuration frame grabbing apparatus of claim 2, including image display means connected to said computer for transforming digital image data into a visual image, and a computer-generated movable cursor superimposed on said visual image spatially calibrated to the precise mensuration of said grid marks in relation to said visual image, said cursor being movable from any point on said visual image to any other point on the visual image in such a manner that the distance of movement between said points is a precise scale mensuration of actual distance between the points.

4. The mensuration frame grabbing apparatus of claim 2, wherein said translation camera mounting means includes an X-axis drive, a Y-axis drive, and a Z-axis drive, all connected to said translation camera mounting means for moving the camera in the directions of the X-axis, Y-axis, and Z-axis, said X-axis drive having a X-axis stepper motor for moving the camera in precise X-axis spatial increments, said Y-axis drive having a Y-axis stepper motor for moving the camera in precise Y-axis spatial increments, and said Z-axis drive having a Z-axis stepper motor for moving the camera in precise Z-axis spatial increments.

5. The mensuration frame grabbing apparatus of claim 4, wherein said camera position sensing means includes X-axis encoder means connected to said X-axis stepper motor for outputting signal data indicating motion of the motor, X-axis direction sensing logic means connected to said X-axis encoder means for correlating the output from the X-axis encoder means with data indicating direction in the X-axis that the camera is moved, X-axis motor driver means connected to the X-axis stepper motor for generating drive signals to cause the X-axis stepper motor to turn in prescribed step increments, and an X-axis microprocessor connected to the computer means, connected to said X-axis direction sensing logic means, and to said X-axis motor driver means for receiving X-axis driver data from the computer means and processing it to the X-axis motor driver means and for receiving direction logic from said X-axis direction sensing logic means and processing it, along with driver data, into X-axis position coordinate data in relation to the table coordinate for transmission to said computer means.

6. The mensuration frame grabbing apparatus of claim 5, wherein said camera position sensing means includes Y-axis encoder means connected to said Y-axis stepper motor for outputting signal data indicating motion of the motor, Y-axis direction sensing logic means connected to said Y-axis encoder means for correlating the output from the Y-axis encoder means with data indicating direction in the Y-axis that the camera is moved, Y-axis motor driver means connected to the Y-axis stepper motor for generating drive signals to cause the Y-axis stepper motor to turn in prescribed step increments, and an Y-axis microprocessor connected to the computer means, connected to said Y-axis direction sensing logic means, and to said Y-axis motor driver means for receiving Y-axis driver data from the computer means and processing it to the Y-axis motor driver means and for receiving direction logic from said Y-axis direction sensing logic means and processing it, along with driver data, into Y-axis position coordinate data in relation to the table coordinate for transmission to said computer means.

7. The mensuration frame grabbing apparatus of claim 6 wherein said camera position sensing means includes Z-axis encoder means connected to said Z-axis stepper motor for outputting signal data indicating motion of the motor, Z-axis direction sensing logic means connected to said Z-axis encoder means for correlating the output from the Z-axis encoder means to data indicating direction in the Z-axis that the camera is moved, Z-axis motor driver means connected to the Z-axis stepper motor for generating drive signals to cause the Z-axis stepper motor to turn in prescribed step increments, and an Z-axis microprocessor connected to the computer means, connected to said Z-axis direction sensing logic means, and to said Z-axis motor driver means for receiving Z-axis driver data from the computer means and processing it to the Z-axis motor driver means and for receiving direction logic from said Z-axis direction sensing logic means and processing it, along with driver data, into Z-axis position coordinate data in relation to the table coordinate for transmission to said computer means.

8. The mensuration frame grabbing apparatus of claim 7, wherein said camera position sensing means also includes home position stop means connected to said translation camera mounting means for sensing when said camera reaches a predetermined home position with respect to said table and outputting stop signals to said respective microprocessors to stop the respective stepper motors as the camera reaches the home position in each respective axis with respect to the table coordinate system.

9. The mensuration frame grabbing apparatus of claim 8, including a second table, a second reseau assembly mounted in said second table for mounting a second object thereon, a second solid state camera positioned over the second reseau assembly and having a two-dimensional array of light sensor elements, each element being capable of sensing light intensity levels incident thereon independently of the other light sensor elements and outputting a signal indicative of light intensity sensed on a real time basis, said second camera being oriented to receive light from the second object image, second lens means positioned between said second camera and said second reseau assembly for magnifying the second object image as desired and for focusing light rays comprising said second object image onto said array of light sensor elements in said second solid state camera, and second translation camera mounting means on said second table for mounting said second camera and said second lens means over said second reseau assembly and for moving said camera in orthogonal X, Y, and Z axes in relation to said second reseau assembly and in relation to said second object, said second solid state camera also being connected to said computer means in such a manner that light intensity output data from said light sensor element array in said second solid state camera is received by said computer and displayed in said visual image in stereo superimposed along with the visual image from said solid state camera and said object image.

* * * * *

UNITED STATES PATENT AND TRADEMARK OFFICE
CERTIFICATE OF CORRECTION

PATENT NO. : 4,928,169

DATED : May 22, 1990

INVENTOR(S) : Franz W. Leberl, et al

It is certified that error appears in the above-identified patent and that said Letters Patent is hereby corrected as shown below:

In the Abstract, line 6, change "whcih" to --which--.

In Column 5, line 52, after "invention;" insert a new paragraph.

In Column 14, line 34, change "like" to --like,--.

Figure 17:
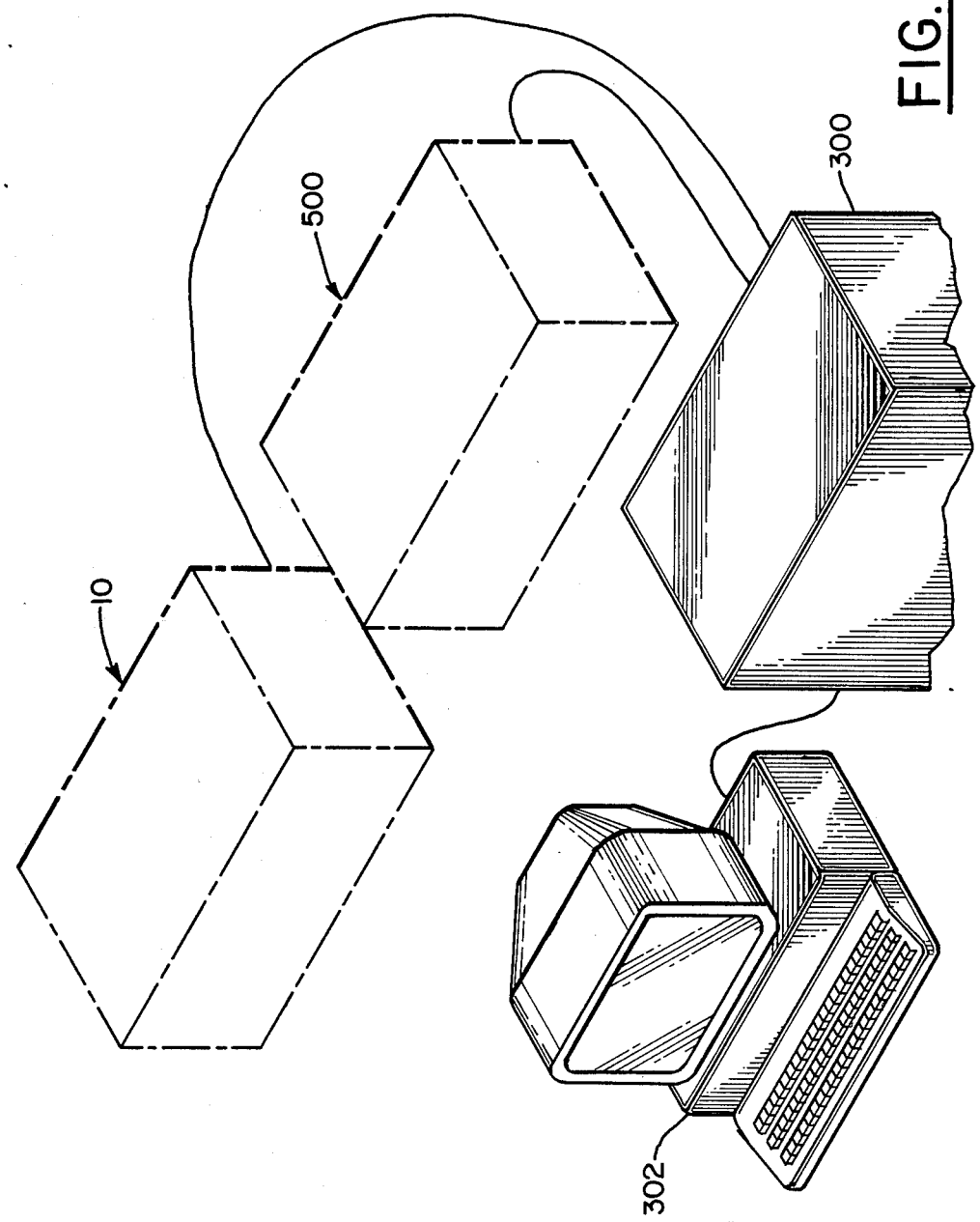
FIG. 17 is a perspective schematic view of the mensuration frame grabber used in stereo according to the present invention.

In Column 15, line 37, after "10" insert --and 500, as illustrated in Figures 14 and 17,--.

In Column 15, line 39, after "detail" insert --in Figure 17,--.

Signed and Sealed this

Sixth Day of August, 1991

Attest:

*Attesting Officer*

HARRY F. MANBECK, JR.

*Commissioner of Patents and Trademarks*

UNITED STATES PATENT AND TRADEMARK OFFICE
CERTIFICATE OF CORRECTION

PATENT NO. : 4,928,169

DATED : May 22, 1990

INVENTOR(S) : Franz W. Leberl, et al.

It is certified that error appears in the above-identified patent and that said Letters Patent is hereby corrected as shown below:

In Column 14, line 33, change "such--;" to --such--.

Signed and Sealed this

Twenty-eighth Day of January, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,928,169
DATED : May 22, 1990
INVENTOR(S) : Franz W. Leberl, et al It is certified that error appears in the above-identified patent and that said Letters Patent is hereby corrected as shown below:

In column 14, line 33, change "such--;" to --such--.

Signed and Sealed this

Third Day of November, 1992

Attest:

DOUGLAS B. COMER

Attesting Officer     Acting Commissioner of Patents and Trademarks